United States Patent
Ueda

(10) Patent No.: US 9,745,201 B2
(45) Date of Patent: Aug. 29, 2017

(54) SYNTHETIC AMORPHOUS SILICA POWDER AND PROCESS FOR MANUFACTURING SAME

(71) Applicant: MITSUBISHI MATERIALS CORPORATION, Tokyo (JP)

(72) Inventor: Toshiaki Ueda, Akita (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/113,570

(22) PCT Filed: Dec. 10, 2014

(86) PCT No.: PCT/JP2014/082652
§ 371 (c)(1),
(2) Date: Jul. 22, 2016

(87) PCT Pub. No.: WO2015/114956
PCT Pub. Date: Aug. 6, 2015

(65) Prior Publication Data
US 2017/0008772 A1    Jan. 12, 2017

(30) Foreign Application Priority Data
Jan. 29, 2014 (JP) .................... 2014-014445

(51) Int. Cl.
*C01B 33/18* (2006.01)

(52) U.S. Cl.
CPC .......... *C01B 33/18* (2013.01); *C01P 2002/02* (2013.01); *C01P 2004/51* (2013.01); *C01P 2004/61* (2013.01); *C01P 2006/10* (2013.01); *C01P 2006/12* (2013.01); *C01P 2006/80* (2013.01)

(58) Field of Classification Search
CPC .. C01B 33/18; C01P 2002/02; C01P 2004/51; C01P 2004/61; C01P 2006/10; C01P 2006/12; C01P 2006/80; Y10T 428/2982
USPC ...................................................... 428/402
See application file for complete search history.

(56) References Cited

U.S. PATENT DOCUMENTS

| 8,883,110 B2 * | 11/2014 | Ueda ................. C01B 33/158 264/15 |
| 9,120,678 B2 * | 9/2015 | Ueda ................. C01B 33/14 |
| 9,272,918 B2 * | 3/2016 | Ueda ................. C01B 33/14 |
| 9,446,959 B2 * | 9/2016 | Ueda ................. C01B 33/1415 |
| 2005/0032965 A1 | 2/2005 | Valero |
| 2009/0202835 A1 | 8/2009 | Pitsch et al. |
| 2012/0010379 A1 | 1/2012 | Siegel et al. |

FOREIGN PATENT DOCUMENTS

| JP | 62-176928 A | | 8/1987 |
| JP | 03-275527 A | | 12/1991 |
| JP | 2000-264622 | * | 9/2000 |
| JP | 2000-264622 A | | 9/2000 |
| JP | 2001-220157 A | | 8/2001 |
| JP | 2005-500238 | * | 1/2005 |
| JP | 2005-500238 A | | 1/2005 |
| JP | 2009-515803 | * | 4/2009 |
| JP | 2009-515803 A | | 4/2009 |
| JP | 4548625 B2 | | 9/2010 |
| JP | 2012-520236 | * | 9/2012 |
| JP | 2012-520236 A | | 9/2012 |
| JP | 2012-211070 | * | 11/2012 |
| JP | 2012-211070 A | | 11/2012 |
| JP | 2012-240900 | * | 12/2012 |
| JP | 2012-240900 A | | 12/2012 |
| JP | 2013-209290 A | | 10/2013 |
| JP | 2013-249218 | * | 12/2013 |
| JP | 2013-249218 A | | 12/2013 |

OTHER PUBLICATIONS

International Search Report mailed Mar. 17, 2015, issued for PCT/JP2014/082652.

* cited by examiner

*Primary Examiner* — Leszek Kiliman
(74) *Attorney, Agent, or Firm* — Locke Lord LLP

(57) ABSTRACT

The purpose of the present invention is to provide: a synthetic amorphous silica powder which is suitable as a raw material for a synthetic silica glass product used in a high-temperature and reduced-pressure environment, which can yield a synthetic silica product such that the occurrence or expansion of air bubbles in the glass product is inhibited even in use in a high-temperature and reduced-pressure environment, and which can be obtained at a relatively low cost; and a process for manufacturing the same.

6 Claims, 7 Drawing Sheets

US 9,745,201 B2

SYNTHETIC AMORPHOUS SILICA POWDER AND PROCESS FOR MANUFACTURING SAME

TECHNICAL FIELD

The present invention relates to a high purity synthetic amorphous silica powder suitable as a raw material for manufacturing a synthetic silica glass product such as a jig and a crucible used under environments of high temperature and reduced pressure in the semiconductor industry, etc., and a process for manufacturing the same. The present International Application claims a priority of Japanese Patent Application No. 2014-14445 filed on Jan. 29, 2014 and the whole contents of Japanese Patent Application No. 2014-14445 are incorporated herein by reference.

BACKGROUND ART

A crucible or a jig to be used for manufacturing single crystal for the use of a semiconductor has heretofore been manufactured by using a quartz powder obtained by pulverizing natural quartz or silica sand and purifying the same as a raw material. However, the natural quartz or the silica sand contains various metal impurities, and even when the above purification treatment has been done, the metal impurities cannot completely be removed, so that it cannot be sufficiently satisfied in the point of purity. Also, accompanied by the progress of high integration of the semiconductor, a quality of the single crystal which becomes a material has been required to be heightened, whereby the crucible or the jig used for manufacturing the single crystal has also been required to be a high purity product. Therefore, a synthetic silica glass product using a high purity synthetic amorphous silica powder as a raw material has been attracted attention in place of the natural quartz or the silica sand.

As a process for manufacturing the high purity synthetic amorphous silica powder, a method in which high purity silicon tetrachloride is hydrolyzed by water, and the formed silica gel is dried, sized and fired to obtain a synthetic amorphous silica powder has been disclosed (for example, see Patent Document 1). It has also been disclosed a method in which an alkoxysilane such as a silicic acid ester is hydrolyzed in the presence of an acid and an alkali to make a gel, and the obtained gel is dried, pulverized and fired to obtain a synthetic amorphous silica powder (for example, see Patent Documents 2 and 3). Further, it has been disclosed a method in which a slurry of fumed silica is produced, and it is dried, pulverized and then calcined to obtain a synthetic amorphous silica powder (for example, see Patent Documents 4 and 5). The synthetic amorphous silica powders manufactured by the methods described in the above-mentioned Patent Documents 1 to 5 have high purity as compared with the natural quartz or the silica sand, so that it is possible to reduce migration of impurities from the synthetic silica glass product such as a crucible or a jig manufactured by using these as raw materials or to make the product high performances.

PRIOR ART DOCUMENT

Patent Document

Patent document 1: JP Hei.4-75848B (claim 1 of Scope of claim for Patent)
Patent document 2: JP Sho.62-176928A (claim 1 of Scope of claim for Patent)
Patent document 3: JP Hei.3-275527A (page 2, lower left column, line 7 to page 3, upper left column, line 6)
Patent document 4: Japanese Patent No. 4,548,625
Patent document 5: JP 2001-220157A

SUMMARY OF THE INVENTION

Problems to be Solved by the Invention

The synthetic silica glass products manufactured by using the synthetic amorphous silica powders manufactured by the methods described in the above Patent Documents 1 to 5 as a raw material have, however, a defect that, if the use environment is a high-temperature and reduced-pressure environment, air bubbles occur in the product or air bubbles originally presented are expanded to markedly lower the properties of the synthetic silica glass products.

A crucible for pulling a silicon single crystal is, for example, a synthetic silica glass product generally used under an environment at a high-temperature around 1,500° C. and a reduced-pressure around 7,000 Pa. Thus, properties of the crucible are markedly lowered by the above-mentioned generation or expansion of the air bubbles, whereby the problem that the quality of the single crystal to be pulled is affected has generated. Also, due to larger size of the silicon single crystal, the use environment of the crucible for pulling a silicon single crystal tends to be a higher temperature and a longer term.

With regard to the problems generated in the use in such a high-temperature and reduced-pressure environment, it can be considered to take a measure that a heat treatment is applied to a synthetic amorphous silica powder obtained by hydrolysis of silicon tetrachloride whereby concentrations of a hydroxyl group and chlorine in the synthetic amorphous silica powder are each reduced, and a heat treatment is applied to a synthetic amorphous silica powder obtained by a sol-gel method of an alkoxysilane whereby concentrations of a hydroxyl group and carbon in the synthetic amorphous silica powder are each reduced, further a heat treatment is applied to a synthetic amorphous silica powder obtained from a slurry of fumed silica whereby a concentration of a hydroxyl group is reduced, so that concentrations of impurities capable of becoming a gas component(s) in the synthetic amorphous silica powder are reduced.

However, even if the above-mentioned measure has been carried out, it is the present status that occurrence or expansion of air bubbles in the synthetic silica glass product to be used in a high-temperature and reduced-pressure environment cannot sufficiently be suppressed.

According to the research by the present inventor, it could be clarified that if the concentrations of a hydroxyl group, chlorine, carbon, etc., in the synthetic amorphous silica powder which have been considered to be a main cause of the air bubbles are suppressed to a prescribed concentration, occurrence or expansion of the air bubbles in the synthetic silica glass product cannot be suppressed any more even when the concentration is further lowered. This result suggests that there are other causes as the cause of occurrence or expansion of the air bubbles in the synthetic silica glass product, so that the present inventor has researched on the causes thereof by focusing the correlation of powder characteristics of a particle size distribution, a bulk density, a packing density, etc., of the synthetic amorphous silica powder to be used.

As a result, among the powder characteristics of the above-mentioned synthetic amorphous silica powder, he has found that the correlation with the particle size distribution and the bulk density is particularly high, and the correlation with a number of fine particles contained in the powder is high, so that occurrence or expansion of the air bubbles in the synthetic silica glass product can be markedly suppressed with a low cost by strictly controlling these characteristics.

An object of the present invention is to provide a synthetic amorphous silica powder suitable for a raw material of a synthetic silica glass product to be used in a high-temperature and a reduced-pressure environment, which can stably suppress occurrence or expansion of the air bubbles in use in a high-temperature and reduced-pressure environment, and which can be obtained at a relatively low cost and a process for manufacturing the same.

Means to Solve the Problems

As a result of intensive studies by the present inventor, he has obtained a finding that in the synthetic silica glass product used in a high-temperature and reduced-pressure environment, it is important for stably suppressing occurrence or expansion of the air bubbles that, in addition to reduce the concentrations of a hydroxyl group, chlorine or carbon contained in the synthetic amorphous silica powder to be used as a raw material for manufacturing the same, an amount of a residual gas existing between the particles at the time of melting the synthetic amorphous silica powder is made little, and a flow passage (a path) to discharge the gas existing between the particles at the time of melting the powder to the outside is secured by strictly controlling the powder characteristics or reducing a number of fine particles contained in the powder.

The first aspect of the present invention is directed to a synthetic amorphous silica powder obtained by subjecting silica as a raw material to granulation and firing, wherein a particle diameter $D_{v50}$ at a cumulative frequency of 50% in a volume-based particle size distribution is 72 μm or more and 509 μm or less, a cumulative frequency of particles having volume-based diameters of 45 μm or less is 1.8% or less, a value obtained by dividing a difference between a particle diameter $D_{v90}$ at a cumulative frequency of 90% in a volume-based particle size distribution and a particle diameter $D_{v10}$ at a cumulative frequency of 10% in a volume-based particle size distribution by a particle diameter $D_{v50}$ at a cumulative frequency of 50% in a volume-based particle size distribution is 0.79 or more and 1.40 or less, $F_{NL}/F_{NS}$ which is a ratio of a frequency $F_{NL}$ of a frequency peak in a number-based particle size distribution existing at a neighbor of the particle diameter $D_{v50}$ at a cumulative frequency of 50% in a volume-based particle size distribution, and a frequency $F_{NS}$ of a frequency peak in a number-based particle size distribution existing at a particle diameter of 30 μm or less is 0.3 or more and a bulk density is 0.75 g/cm$^3$ or more and 1.5 g/cm$^3$ or less.

The second aspect of the present invention is an invention based on the first aspect, wherein fumed silica having a specific surface area of 50 to 200 m$^2$/g is used as a raw material, a concentration of carbon is less than 2 ppm, a concentration of a hydroxyl group is less than 70 ppm, and a concentration of chlorine is less than 2 ppm.

The third aspect of the present invention is directed to a process for manufacturing a synthetic amorphous silica powder which comprises a granulation step of forming a siliceous slurry and obtaining silica powder having a particle diameter $D_{v50}$ at a cumulative frequency of 50% in the volume-based particle size distribution of 100 to 700 μm from the siliceous slurry, a step of subjecting the silica powder obtained in the granulation step to a primary firing at a temperature of 900 to 1200° C., a step of subjecting the silica powder after the primary firing to pulverization and a secondary firing at a temperature of 1100 to 1400° C., a step of subjecting the silica powder after the secondary firing to pulverization and washing with a ultrasonic wave or washing by using a fluorine-based inert liquid, and a step of subjecting the silica powder after washing to solid-liquid separation using a sieve having openings of 35 to 95 μm and drying to obtain synthetic amorphous silica powder having a particle diameter $D_{v50}$ at a cumulative frequency of 50% in the volume-based particle size distribution of 72 μm or more and 509 μm or less, a cumulative frequency of particles having volume-based diameters of 45 μm or less of 1.8% or less, a value obtained by dividing a difference between a particle diameter $D_{v90}$ at a cumulative frequency of 90% in a volume-based particle size distribution and a particle diameter $D_{v10}$ at a cumulative frequency of 10% in a volume-based particle size distribution by a particle diameter $D_{v50}$ at a cumulative frequency of 50% in a volume-based particle size distribution of 0.79 or more and 1.40 or less, $F_{NL}/F_{NS}$ which is a ratio of a frequency $F_{NL}$ of a frequency peak in a number-based particle size distribution existing at a neighbor of the particle diameter $D_{v50}$ at a cumulative frequency of 50% in a volume-based particle size distribution, and a frequency $F_{NS}$ of a frequency peak in a number-based particle size distribution existing at a particle diameter of 30 μm or less of 0.3 or more and a bulk density of 0.75 g/cm$^3$ or more and 1.5 g/cm$^3$ or less.

The fourth aspect of the present invention is an invention based on the third aspect, wherein the granulation step is a step which further comprises hydrolyzing silicon tetrachloride to form a siliceous slurry, drying the siliceous slurry to make a dry powder, and classifying the dry powder after pulverization or without pulverization.

The fifth aspect of the present invention is an invention based on the third aspect, wherein the granulation step is a step which further comprises hydrolyzing an organic silicon compound to form a siliceous slurry, drying the siliceous slurry to make a dry powder, and classifying the dry powder after pulverization or without pulverization.

The sixth aspect of the present invention is an invention based on the third aspect, wherein the granulation step is a step which further comprises forming a siliceous slurry by using fumed silica, drying the siliceous slurry to make a dry powder, and classifying the dry powder after pulverization or without pulverization.

Effects of the Invention

The synthetic amorphous silica powder which is the first aspect of the present invention has a particle diameter $D_{v50}$ at a cumulative frequency of 50% in the volume-based particle size distribution of 72 μm or more and 509 μm or less, a cumulative frequency of particles having volume-based diameters of 45 μm or less of 1.8% or less, a value obtained by dividing a difference between a particle diameter $D_{v90}$ at a cumulative frequency of 90% in the volume-based particle size distribution and a particle diameter $D_{v10}$ at a cumulative frequency of 10% in the volume-based particle size distribution by a particle diameter $D_{v50}$ at a cumulative frequency of 50% in the volume-based particle size distribution of 0.79 or more and 1.40 or less, $F_{NL}/F_{NS}$ which is a ratio of a frequency $F_{NL}$ of a frequency peak in the number-based particle size distribution existing at a neighbor of the particle diameter $D_{v50}$ at a cumulative frequency of 50% in the volume-based particle size distribution and a frequency $F_{NS}$ of a frequency peak in the number-based particle size distribution existing at a particle diameter of 30 μm or less of 0.3 or more and a bulk density of 0.75 g/cm³ or more and 1.5 g/cm³ or less. According to these constitutions, in the synthetic amorphous silica powder, an amount of a residual gas existing between the particles at the time of melting the powder is a little and a path to discharge the gas to the outside is sufficiently secured at the time of melting the powder. Therefore, when the synthetic amorphous silica powder is used for a synthetic silica glass product such as a crucible for pulling a silicon single crystal, etc., to be used in a high-temperature and reduced-pressure environment, occurrence or expansion of the air bubbles can be suppressed. Also, with regard to suppression of occurrence or expansion of the air bubbles, a relatively high effect can be obtained even when no specific treatment such as a spheroidizing treatment, etc., is applied, so that it can be obtained with a low cost.

In the synthetic amorphous silica powder of the second aspect of the present invention, fumed silica is used as a raw material, all the concentrations of carbon, a hydroxyl group and chlorine which become causes of occurrence of the air bubbles are markedly reduced. Therefore, as compared with the synthetic amorphous silica powder using the other silica as a raw material, an effect of suppressing occurrence or expansion of the air bubbles can be more heightened. In addition, as fumed silica having a prescribed specific surface area is used, it is excellent in the point of handling property at the time of the granulation.

In the manufacturing process in the third to the sixth aspects of the present invention, for example, silicon tetrachloride is hydrolyzed to form a siliceous slurry, an organic silicon compound such as tetramethoxysilane, etc., is hydrolyzed to form a siliceous slurry, or fumed silica is used to form a siliceous slurry. The process comprises a granulation step of obtaining a silica powder having a particle diameter $D_{v50}$ at a cumulative frequency of 50% in the volume-based particle size distribution of 100 to 700 μm from the siliceous slurry, a step of subjecting the silica powder obtained in the granulation step to a primary firing at a temperature of 900 to 1,200° C., a step of pulverizing the silica powder after the primary firing and subjecting the same to a secondary firing at a temperature of 1,100 to 1,400° C., a step of pulverizing the silica powder after the secondary firing and subjecting the same to washing with an ultrasonic wave or washing by using a fluorine-based inert liquid, and a step of subjecting the silica powder after the washing to a solid-liquid separation using a sieve having openings of 35 to 95 μm and drying the same, whereby a synthetic amorphous silica powder having a particle diameter $D_{v50}$ at a cumulative frequency of 50% in the volume-based particle size distribution of 72 μm or more and 509 μm or less, a cumulative frequency of particles having volume-based diameters of 45 μm or less of 1.8% or less, a value obtained by dividing the difference between a particle diameter $D_{v90}$ at a cumulative frequency of 90% in the volume-based particle size distribution and a particle diameter $D_{v10}$ at a cumulative frequency of 10% in the volume-based particle size distribution by the particle diameter $D_{v50}$ at a cumulative frequency of 50% in the volume-based particle size distribution of 0.79 or more and 1.40 or less, $F_{NL}/F_{NS}$ which is a ratio of a frequency $F_{NL}$ of a frequency peak in the number-based particle size distribution existing at a neighbor of the particle diameter $D_{v50}$ at a cumulative frequency of 50% in the volume-based particle size distribution and a frequency $F_{NS}$ of a frequency peak in the number-based particle size distribution existing at a particle diameter of 30 μm or less of 0.3 or more and a bulk density of 0.75 g/cm³ or more and 1.5 g/cm³ or less is obtained. By performing the abovementioned steps, occurrence or expansion of the air bubbles can be suppressed, and a synthetic amorphous silica powder capable of suitably using as a raw material for a synthetic silica glass product can be manufactured with a low cost.

EMBODIMENTS TO CARRY OUT THE INVENTION

Figure 1:
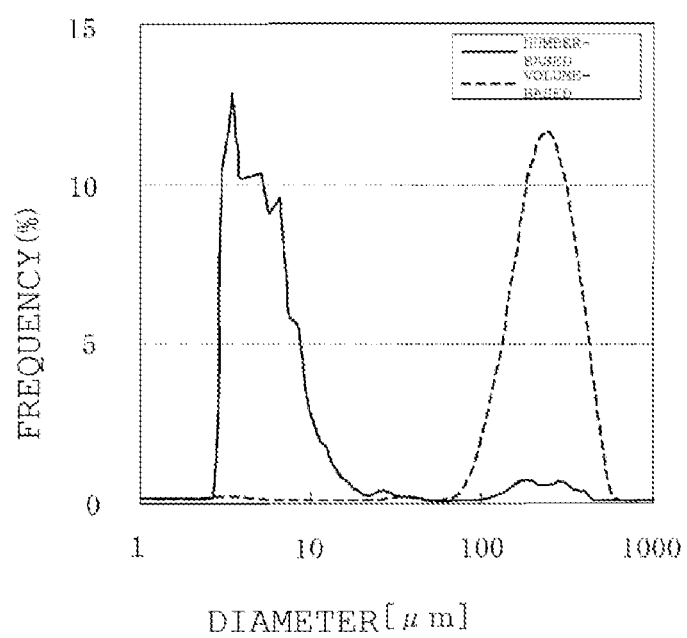
FIG. 1 is a drawing showing volume-based and number-based particle size distributions of the synthetic amorphous silica powder before washing with an ultrasonic wave of Example 3.

Next, embodiments to carry out the present invention are explained based on the drawings.

The synthetic amorphous silica powder of the present invention can be obtained by granulation and firing using silica as a raw material. It comprises a particle diameter $D_{v50}$ at a cumulative frequency of 50% in the volume-based particle size distribution of 72 μm or more and 509 μm or less, a cumulative frequency of particles having volume-based diameters of 45 μm or less of 1.8% or less, a value obtained by dividing the difference between a particle diameter $D_{v90}$ at a cumulative frequency of 90% in the volume-based particle size distribution and a particle diameter $D_{v10}$ at a cumulative frequency of 10% in the volume-based particle size distribution by the particle diameter $D_{v50}$ at a cumulative frequency of 50% in the volume-based particle size distribution of 0.79 or more and 1.40 or less, $F_{NL}/F_{NS}$ which is a ratio of a frequency $F_{NL}$ of a frequency peak in the number-based particle size distribution existing at a neighbor of the particle diameter $D_{v50}$ at a cumulative frequency of 50% in the volume-based particle size distribution and a frequency $F_{NS}$ of a frequency peak in the number-based particle size distribution existing at a particle diameter of 30 μm or less of 0.3 or more and a bulk density of 0.75 g/cm³ or more and 1.5 g/cm³ or less. In the present specification, a volume-based particle diameter and particle size distribution of the synthetic amorphous silica powder are values measured by using a laser diffraction type particle size measuring apparatus (Type name: MS-3000 manufactured by Spectris Co., Ltd). Also, the bulk density means a loose bulk density, and a value measured by using a Powder Tester (Type name: PT-X manufactured by Hosokawa Micron Corporation). Further, the frequency peak in the number-based particle size distribution existing at a neighbor of the particle diameter $D_{v50}$ at a cumulative frequency of 50% in the volume-based particle size distribution means the maximum one existing in close proximity to the particle diameter $D_{v50}$ at a cumulative frequency of 50% in the volume-based particle size distribution, which excludes the frequency peaks in the number-based particle size distribution existing at the particle diameter of 30 μm or less. Moreover, the frequency peak in the number-based particle size distribution existing at the particle diameter of 30 μm or less means the maximum one among the frequency peaks existing at the particle diameter of 30 μm or less in the number-based particle size distribution.

If the particle diameter $D_{v50}$ at a cumulative frequency of 50% in the volume-based particle size distribution is less than 72 μm, particles of the synthetic amorphous silica powder are easily melted at the time of melting the synthetic amorphous silica powder, an amount of the residual gas existing between the particles of the synthetic amorphous silica powder is large so that the air bubbles occur with a large amount. On the other hand, if the $D_{v50}$ of the synthetic amorphous silica powder is larger than 509 μm, the space between the particles of the synthetic amorphous silica powder is large so that an amount of the residual gas existing between the particles is large at the time of melting the synthetic amorphous silica powder whereby the air bubbles occur with a large amount. Among these, the particle diameter $D_{v50}$ at a cumulative frequency of 50% in the volume-based particle size distribution is preferably 76 μm or more and 509 μm or less, particularly preferably 90 μm or more and 460 μm or less.

The particles having volume-based diameters of 45 μm or less of the synthetic amorphous silica powder are smaller as compared with the particle diameter $D_{v50}$ at a frequency of 50% in the volume-based particle size distribution of 72 μm or more and 509 μm or less of the synthetic amorphous silica powder, so that it is easily melted at the time of melting the synthetic amorphous silica powder. Thus, when the frequency of the particles having volume-based diameters of 45 μm or less of the synthetic amorphous silica powder is 1.8% or more, a large number of the particles which are easily melted exist so that a large amount of the gas is remained between the particles of the melted synthetic amorphous silica powder, whereby the air bubbles occur. Among these, the cumulative frequency of particles having volume-based diameters of 45 μm or less is preferably 0.5% or less.

If the value obtained by dividing the difference between the particle diameter $D_{v90}$ at a cumulative frequency of 90% in the volume-based particle size distribution and the particle diameter $D_{v10}$ at a cumulative frequency of 10% in the volume-based particle size distribution by the particle diameter $D_{v50}$ at a cumulative frequency of 50% in the volume-based particle size distribution, i.e., the value of $(D_{v90}-D_{v10})/D_{v50}$ is less than 0.79, the particles of the synthetic amorphous silica powder are simultaneously melted, so that an amount of the residual gas existing between the particles is large at the time of melting the synthetic amorphous silica powder. If the value of $(D_{v90}-D_{v10})/D_{v50}$ exceeds 1.40, fluctuation of the particle diameter of the synthetic amorphous silica powder becomes large. Thus, fluctuation in the melting rate is large so that a path to discharge the above-mentioned gas to the outside cannot sufficiently be secured, and an amount of the residual gas existing between the particles is large at the time of melting the synthetic amorphous silica powder. On the other hand, if the value of $(D_{v90}-D_{v10})/D_{v50}$ is 0.79 or more and 1.40 or less, there are suitable difference in melting rates between the particles so that an amount of the residual gas existing between the particles at the time of melting the synthetic amorphous silica powder becomes a little, and the path to discharge the gas to the outside can be secured, whereby an amount of the residual gas is reduced. Among these, the value of $(D_{v90}-D_{v10})/D_{v50}$ is preferably 0.85 or more and 1.0 or less.

If the bulk density of the synthetic amorphous silica powder is smaller than 0.75 g/cm³, the space between the particles of the synthetic amorphous silica powder becomes large so that an amount of the residual gas existing between the particles at the time of melting the synthetic amorphous silica powder is large whereby many air bubbles occur. On the other hand, if the bulk density of the synthetic amorphous silica powder exceeds 1.5 g/cm³, a flow passage (a path) of the gas existing between the particles cannot be ensured at the time of melting the synthetic amorphous silica powder, and the gas to be discharged therethrough is remained whereby many air bubbles are remained therein.

If the $F_{NL}/F_{NS}$ which is a ratio of a frequency $F_{NL}$ of a frequency peak in the number-based particle size distribution existing at a neighbor of the particle diameter $D_{v50}$ at a cumulative frequency of 50% in the volume-based particle size distribution and a frequency $F_{NS}$ of a frequency peak in the number-based particle size distribution existing at a particle diameter of 30 μm or less is less than 0.3, many fine particles which are contained in the synthetic amorphous silica powder are contained, and an amount of the residual gas existing between the particles is large at the time of melting the synthetic amorphous silica powder, whereby the air bubbles are increased.

In the present invention, the reason why the number-based particle size distribution is attracted attention is that, in the volume-based particle size distribution measured by a laser diffraction type particle size measuring device, the presence of the synthetic amorphous silica powder with extremely smaller size than the particle diameter $D_{v50}$ at a cumulative frequency of 50% in the volume-based particle size distribution is likely ignored, but in the number basis, if a large number of the synthetic amorphous silica powders having an extremely small particle diameter exist, these are likely and accurately reflected on the numerical value. Among these, $F_{NL}/F_{NS}$ is preferably 0.30 or more and 3.24 or less, particularly preferably 0.7 or more and 3.24 or less. The number-based particle size distribution is a value measured by using a particle image analyzer (Type name: Mophologi G3 manufactured by Spectris Co., Ltd).

For reducing migration of impurities of the synthetic silica glass product or for realizing high performance, concentrations of impurities of the synthetic amorphous silica powder are preferably concentrations of Group 1A except for a hydrogen atom, Groups 2A to 8, Groups 1B to 3B, Group 4B except for carbon and silicon, Group 5B, Group 6B except for oxygen, Group 7B except for chlorine of less than 2 ppm. Among these, concentrations of these impurities are particularly preferably less than 0.5 ppm.

To suppress occurrence or expansion of the air bubbles in the synthetic silica glass product under high temperature and reduced pressure, it is preferred that the concentration of a hydroxyl group which can be a gas component is 70 ppm or less, the concentration of chlorine is less than 2 ppm, and the concentration of carbon is less than 2 ppm. In the synthetic amorphous silica powder of the present invention, an amount of a gas component adsorbed at the surface or a gas component at the inside of the powder becomes extremely little by selecting a starting raw material(s) or by optimizing the drying and firing conditions, whereby the reducing effect of occurrence or expansion of the air bubbles in the synthetic silica glass product can be more heightened.

In the synthetic amorphous silica powder using silica obtained by hydrolyzing silicon tetrachloride as a raw material, it can accomplish a concentration of carbon of less than 2 ppm. This is because silicon tetrachloride does not contain a carbon atom like an organic silicon compound such as tetramethoxysilane, etc., so that a concentration of the residual carbon is relatively reduced. In the synthetic amorphous silica powder using silica obtained by hydrolyzing an organic silicon compound as a raw material, it can accomplish a concentration of chlorine of less than 2 ppm. The above-mentioned silica powder has a lower concentration of chlorine as compared with that of the silica powder obtained by reacting a chlorine-based silicon compound in a liquid, and in the synthetic amorphous silica powder obtained by using the same as a raw material powder, a concentration of the residual chlorine can be relatively reduced.

To the contrary, in the synthetic amorphous silica powder using fumed silica as a raw material, a concentration of carbon is less than 2 ppm and a concentration of chlorine is less than 2 ppm. In the synthetic amorphous silica powder obtained by using the silica powder which is obtained by reacting a chlorine-based silicon compound in a liquid as the raw material powder, a concentration of the residual chlorine becomes relatively high. Also, in the synthetic amorphous silica powder obtained by using an organic silicon compound as the raw material powder, a concentration of the residual carbon tends to become relatively high. On the other hand, fumed silica is lower in both of the concentration of chlorine and the concentration of carbon as compared with the above-mentioned two silica powders, so that in the synthetic amorphous silica powder obtained by using the fumed silica as the raw material powder, both of the concentration of chlorine and the concentration of carbon can be extremely reduced. Further, by controlling the firing atmosphere, a concentration of the hydroxyl group of less than 70 ppm can be accomplished.

A specific surface area of the fumed silica to be used as a raw material is preferably 50 to 200 $m^2/g$. If the specific surface area is less than 50 $m^2/g$, when the fumed silica is mixed with pure water to prepare a siliceous slurry and the siliceous slurry is dried to prepare a dry powder, aggregability between the particles of the fumed silica is not good so that the dry powder is likely collapsed and pulverizability at the time of pulverization is not good. Also, if the specific surface area of the fumed silica exceeds 200 $m^2/g$, the content of the silica in the siliceous slurry is reduced and the content of water is increased so that it is not preferred in the viewpoint of economical efficiency.

Figure 5:
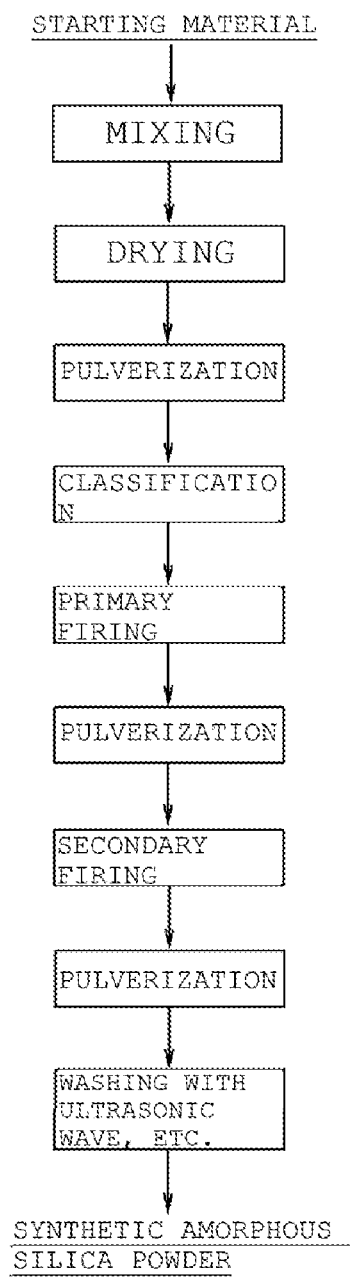
FIG. 5 is a process flowchart showing the manufacturing process of the synthetic amorphous silica powder of the present invention.

Subsequently, a process for manufacturing the synthetic amorphous silica powder of the present invention is explained. A simple process flow with regard to the manufacturing process is shown in FIG. 5. The first method is a method using silicon tetrachloride as a raw material, and in this method, ultrapure water corresponding to an amount of 3 to 9 kg based on 170 g of silicon tetrachloride is firstly prepared. The prepared ultrapure water is charged in a vessel, and silicon tetrachloride is added thereto to hydrolyze the same under an atmosphere of nitrogen or argon by retaining the temperature preferably at 10 to 45° C., more preferably at 20 to 45° C. while mixing by stirring. Mixing by stirring is continued for 0.5 to 6 hours after addition of the silicon tetrachloride to form a siliceous slurry. At this time, the stirring rate is preferably set within the range of 100 to 300 rpm. Next, the siliceous slurry is transferred to a vessel for drying, the vessel is charged in a dryer, and the slurry is dried at a temperature of 200° C. to 300° C. for 12 to 48 hours while flowing nitrogen or argon with a flow amount of preferably 1 to 20 L/min in the dryer to obtain a dry powder. The drying may be carried out, other than the above-mentioned methods, by using a rotary kiln, a spray dryer of a disc type atomizer, etc. When the rotary kiln is used, the siliceous slurry is charged in the retort of the rotary kiln while flowing nitrogen or argon with a flow amount of 5 to 20 L/min and dried at a temperature of 500° C. to 1,000° C. for 0.25 to 2 hours to obtain a dry powder. When the spray dryer of the disc type atomizer is used, granulation is simultaneously carried out, so that classification is carried out without subjecting to the next pulverization. Next, the dry powder was taken out from the dryer, and pulverized by using a pulverizing machine such as a roll crusher. When the roll crusher is used, it is carried out by optionally adjusting a gap between rolls to 0.2 to 0.7 mm and a number of the rotation of the rolls to 40 to 150 rpm.

Next, the pulverized or not pulverized dry powder is classified by using a vibratory sieve, etc., to obtain a granulated silica powder having a particle diameter $D_{v50}$ at a cumulative frequency of 50% in the volume-based particle size distribution of 100 to 700 μm, preferably 300 to 650 μm. The obtained silica powder is then subjected to the steps such as firing, pulverization and classification mentioned later.

The second method is a method using an organic silicon compound as a raw material, and according to this method, 0.5 to 3 mol of ultrapure water and 0.5 to 3 mol of ethanol are firstly prepared based on 1 mol of tetramethoxysilane as an organic silicon compound. The prepared ultrapure water and ethanol are charged in a vessel, and tetramethoxysilane is added thereto to hydrolyze the same under an atmosphere of nitrogen, argon or the like by retaining the temperature at 60° C. while mixing by stirring. Mixing by stirring is carried out for 5 to 120 minutes after addition of the tetramethoxysilane, and 1 to 50 mol of ultrapure water is further added based on 1 mol of tetramethoxysilane and mixing by stirring are continued for 1 to 12 hours to form a siliceous slurry. At this time, the stirring rate is preferably set within the range of 100 to 300 rpm. Next, the siliceous slurry is transferred to a vessel for drying, the vessel is charged in a dryer, and the slurry is dried at a temperature of 200° C. to 300° C. for 12 to 48 hours while flowing nitrogen, argon or the like with a flow amount of preferably 1 to 20 L/min in the dryer to obtain a dry powder. The drying may be carried out, other than the above-mentioned methods, by using a rotary kiln, a spray dryer of a disc type atomizer or the like. When the rotary kiln is used, the siliceous slurry is charged in the retort of the rotary kiln while flowing nitrogen, argon or the like with a flow amount of 5 to 20 L/min and dried at a temperature of 500° C. to 1,000° C. for 0.25 to 2 hours to obtain a dry powder. When the spray dryer of the disc type atomizer is used, granulation is simultaneously carried out, so that classification is carried out without subjecting to the next pulverization. Next, the dry powder was taken out from the dryer, and pulverized by a pulverizer such as a roll crusher, etc. When the roll crusher is used, it is carried out by optionally adjusting a gap between rolls to 0.2 to 0.7 mm and a number of the rotation of the rolls to 40 to 150 rpm.

Next, the pulverized or not pulverized dry powder is classified by using a vibratory sieve, etc., a granulated silica powder having a particle diameter $D_{v50}$ at a cumulative frequency of 50% in the volume-based particle size distribution of 100 to 700 μm, preferably 300 to 650 μm can be obtained. The obtained silica powder is then subjected to the steps such as firing, pulverization and classification mentioned later.

The third method is a method using fumed silica as a raw material, and according to this method, 1.0 to 20 kg of ultrapure water is prepared based on 1 kg of fumed silica having a specific surface area of 50 to 200 m²/g. The specific surface area means a value by the BET three-point method measured by a gas adsorption amount measurement device (Type name: AUTOSORB-1 MP manufactured by Quantachrome Corporation). The prepared ultrapure water is charged in a vessel, and fumed silica is added thereto under an atmosphere of nitrogen, argon or the like by retaining the temperature at 10 to 30° C. while mixing by stirring. Mixing by stirring is continued for 0.5 to 6 hours after addition of the fumed silica to form a siliceous slurry. At this time, the stirring rate is preferably set within the range of 10 to 100 rpm, particularly preferably set within the range of 10 to 50 rpm. The mixing may be carried out, other than the above-mentioned methods, by using a flow jet mixer or a continuous kneading apparatus 50 shown in FIG. 6 mentioned later. The continuous kneading apparatus 50 can mix the fumed silica and the ultrapure water continuously, and can form a siliceous slurry containing fumed silica with a high concentration so that it is excellent in the point of mass productivity. Next, the siliceous slurry is transferred to a vessel for drying, the vessel is charged in a dryer, and the slurry is dried at a temperature of 200° C. to 300° C. for 12 to 48 hours while flowing nitrogen, argon or the like with a flow amount of preferably 1 to 20 L/min in the dryer to obtain a dry powder. The drying may be carried out, other than the above-mentioned methods, by using a rotary kiln, a spray dryer of a disc type atomizer or the like. When the rotary kiln is used, the siliceous slurry is charged in the retort of the rotary kiln while flowing nitrogen, argon or the like with a flow amount of 5 to 20 L/min, and dried at a temperature of 500° C. to 1000° C. for 0.25 to 2 hours to obtain dry powder. When the spray dryer of the disc type atomizer is used, granulation is simultaneously carried out, so that classification is carried out without subjecting to the next pulverization. Next, the dry powder was taken out from the dryer, and pulverized by a pulverizer such as a roll crusher, etc. When the roll crusher is used, it is carried out by optionally adjusting a gap between rolls to 0.2 to 0.7 mm and a number of the rotation of the rolls to 40 to 150 rpm.

Next, the pulverized or not pulverized dry powder is classified by using a vibratory sieve, etc., whereby a granulated silica powder having a particle diameter $D_{v50}$ at a cumulative frequency of 50% in the volume-based particle size distribution of 100 to 700 μm, preferably 300 to 650 μm can be obtained.

In the first to the third methods, the silica powder after granulation is then subjected to the following firing, pulverization, and washing steps using ultrasonic wave, etc. The firing is preferably carried out by two-step firing to prevent from welding of the particles with each other. The primary firing is carried out by charging the silica powder in a vessel made of a heat resistant glass or quartz, the vessel is charged in an electric furnace, an atmosphere furnace or an elevating furnace, and the powder is heated preferably in an air, nitrogen or vacuum atmosphere at a temperature of 900 to 1,200° C. for 5 to 30 hours, further preferably for 5 to 24 hours. After subjecting to the primary firing, the powder is pulverized by using a roll crusher, a mortar or the like. When the roll crusher is used, the pulverization herein conducted is so carried out by optionally adjusting a gap between rolls to 0.3 to 1.5 mm and a number of the rotation of the rolls to 10 to 50 rpm. After the pulverization, the silica powder is charged in a vessel made of a heat-resistant glass or quartz, and a secondary firing is again carried out by using an electric furnace, an atmosphere furnace or an elevating furnace. The secondary firing is carried out preferably in an air, oxygen or nitrogen atmosphere at a temperature of 1,100 to 1,400° C. for 24 to 60 hours. After subjecting to the secondary firing, the powder is again pulverized by using a roll crusher, etc. When the roll crusher is used, the pulverization herein conducted is so carried out by optionally adjusting a gap between rolls to 0.2 to 0.7 mm and a number of the rotation of the rolls to 10 to 50 rpm.

The washing with ultrasonic wave is carried out by charging the silica powder after the pulverization and water such as pure water, etc., in a beaker made of Teflon (registered trademark), etc., the beaker made of Teflon (registered trademark) was charged in an ultrasonic wave washing tank while applying the ultrasonic wave thereto preferably for 5 to 20 minutes. Thereafter, the silica powder and water are subjected to solid-liquid separation by using a sieve, etc., preferably having openings of 35 to 95 μm, and washing of the silica powder is carried out by adding water such as pure water, etc., to the solid-liquid separated silica powder. The washing herein may be a washing method by stirring other than the washing with ultrasonic wave. In this case, the above silica powder after the pulverization and a fluorine-based inert liquid are charged in a beaker made of Teflon (registered trademark), etc., and stirred by using a stirring blade, etc., preferably under the conditions of a number of rotation of 20 to 100 rpm and a stirring time of 10 to 30 minutes to carry out the washing. Thereafter, the silica powder and the fluorine inert liquid are subjected to solid-liquid separation by using a sieve, etc., and a fluorine-based inert liquid is again added to the solid-liquid separated silica powder to carry out the washing of the silica powder. The silica powder after washing is charged in a vessel made of Teflon (registered trademark), etc., the vessel is charged in a dryer, and the powder is dried at a temperature of 120 to 250° C. for 12 to 48 hours while flowing dry air with a flow amount of 5 to 20 L/min in the dryer.

According to the above procedure, the synthetic amorphous silica powder of the present invention can be obtained. The synthetic amorphous silica powder can be obtained with a lower cost as compared with that of the powder obtained by applying a spheroidizing treatment, etc., and as compared with the conventional products, a relatively high suppressing effect can be obtained with regard to the air bubbles generated or expanded in the synthetic silica glass product. In addition, it is also possible to obtain a higher suppressing effect with regard to the above-mentioned occurrence or expansion of the air bubbles by applying a spheroidizing treatment to the synthetic amorphous silica powder using an apparatus shown in FIG. 7 mentioned later.

EXAMPLES

Next, Examples of the present invention are explained in detail with Comparative examples.

Example 1

First, 1.9 kg of ultrapure water was prepared based on 1 kg of fumed silica having a specific surface area of 50 m²/g. The prepared ultrapure water was charged in a vessel made of Teflon (registered trademark), and under nitrogen atmosphere, fumed silica was added thereto while mixing by stirring by maintaining the temperature at 25° C. After adding the fumed silica, mixing by stirring was continued for 3 hours to form a siliceous slurry. The stirring rate at this time was made 30 rpm. Next, the siliceous slurry was charged in a retort of a rotary kiln, and dried at a temperature of 600° C. for 1 hour while flowing nitrogen in the retort of the rotary kiln with a flow amount of 10 L/min to obtain a dry powder. The dry powder was taken out from the dryer, and pulverized by using a roll crusher. At this time, the pulverization was carried out by adjusting a gap between rolls to 0.7 mm and a number of the rotation of the rolls to 40 rpm. The pulverized dry powder was classified by using a vibratory sieve having openings of 425 μm and 850 μm to obtain silica powder having a particle diameter $D_{v50}$ at a cumulative frequency of 50% in the volume-based particle size distribution of 693 μm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 1.5 mm and a number of the rotation of the rolls to 10 rpm. Further, the silica powder was again charged in a vessel made of a fused quartz, the vessel was charged in an atmosphere furnace, and the powder was subjected to the secondary firing by heating at a temperature of 1,350° C. for 48 hours while flowing high purity oxygen having a purity of 99.9995% at a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.7 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying an ultrasonic wave for 10 minutes. Thereafter, the silica powder and pure water were charged in a sieve having openings of 95 μm, and the silica powder and pure water were subjected to solid-liquid separation. Further, to the silica powder on the sieve having openings of 95 μm was added pure water to carry out washing of the silica powder.

Finally, the silica powder after washing was charged in a vessel made of Teflon (registered trademark), this was charged in a dryer, and dried at a temperature of 200° C. for 24 hours while flowing nitrogen with a flow amount of 10 L/min in the dryer. According to this procedure, a synthetic amorphous silica powder having a cumulative frequency of particles having volume-based diameters of 45 μm or less of 0.0%, a particle diameter $D_{v10}$ at a cumulative frequency of 10% in the volume-based particle size distribution of 344 μm, a particle diameter $D_{v50}$ at a cumulative frequency of 50% in the volume-based particle size distribution of 509 μm, a particle diameter $D_{v90}$ at a cumulative frequency of 90% in the volume-based particle size distribution of 749 μm, $F_{NL}/F_{NS}$ of 3.24, and a bulk density of 1.50 g/cm³ was obtained.

Example 2

First, 1.0 kg of ultrapure water was prepared based on 1 kg of fumed silica having a specific surface area of 50 m²/g. The prepared ultrapure water was charged in a vessel made of Teflon (registered trademark), and under nitrogen atmosphere, fumed silica was added thereto while mixing by stirring by maintaining the temperature at 25° C. After adding the fumed silica, mixing by stirring was continued for 3 hours to form a siliceous slurry. At this time, the stirring rate was made 100 rpm. Next, the siliceous slurry was transferred to a vessel for drying made of Teflon (registered trademark) and the vessel was charged in a dryer, and the powder was dried at a temperature of 200° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.5 mm and a number of the rotation of the rolls to 40 rpm. The pulverized dry powder was classified by using a vibratory sieve having openings of 224 μm and 630 μm to obtain silica powder having a particle diameter $D_{v50}$ at a cumulative frequency of 50% in the volume-based particle size distribution of 510 μm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.5 mm and a number of the rotation of the rolls to 40 rpm. Further, the silica powder was again charged in the vessel made of a fused quartz, and the vessel was charged in an atmosphere furnace. The powder was subjected to the secondary firing by heating at a temperature of 1,350° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.5 mm and a number of the rotation of the rolls to 40 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, the silica powder and pure water were charged in a sieve having openings of 85 μm, and the silica powder and pure water were subjected to solid-liquid separation. Further, to the silica powder on the sieve having openings of 85 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 μm or less of 0.4%, a particle diameter $D_{v10}$ at a cumulative frequency of 10% in the volume-based particle size distribution of 187 μm, a particle diameter $D_{v50}$ at a cumulative frequency of 50% in the volume-based particle size distribution of 375 μm, a particle diameter $D_{v90}$ at a cumulative frequency of 90% in the volume-based particle size distribution of 560 μm, $F_{NL}/F_{NS}$ of 1.81 and a bulk density of 1.31 g/cm³ was obtained.

Example 3

First, 2.3 kg of ultrapure water was prepared based on 1 kg of fumed silica having a specific surface area of 90 m²/g.

The prepared ultrapure water was charged in a vessel made of Teflon (registered trademark), and under nitrogen atmosphere, fumed silica was added thereto while mixing by stirring by maintaining the temperature at 20° C. After adding the fumed silica, mixing by stirring was continued for 3 hours to form a siliceous slurry. At this time, the stirring rate was made 100 rpm. Next, the siliceous slurry was transferred to a vessel for drying made of Teflon (registered trademark) and the vessel was charged in a dryer, and dried at a temperature of 250° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 60 rpm. The pulverized dry powder was classified by using a vibratory sieve having openings of 120 µm and 400 µm to obtain silica powder having a particle diameter $D_{v50}$ at a cumulative frequency of 50% in the volume-based particle size distribution of 303 µm.

Subsequently, these silica powders were charged in a fused quartz vessel, this vessel was charged in an electric furnace, and heated in an ambient atmosphere at a temperature of 1,195° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.4 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, the silica powder and pure water were charged in a sieve having openings of 48 µm, and the silica powder and pure water were subjected to solid-liquid separation. Further, to the silica powder on the sieve having openings of 48 µm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 µm or less of 0.7%, a particle diameter $D_{v10}$ at a cumulative frequency of 10% in the volume-based particle size distribution of 99 µm, a particle diameter $D_{v50}$ at a cumulative frequency of 50% in the volume-based particle size distribution of 223 µm, a particle diameter $D_{v90}$ at a cumulative frequency of 90% in the volume-based particle size distribution of 364 µm, $F_{NL}/F_{NS}$ of 0.96 and a bulk density of 1.13 g/cm³ was obtained.

Example 4

First, 3.0 kg of ultrapure water was prepared based on 170 g of silicon tetrachloride. The ultrapure water was charged in a vessel made of Teflon (registered trademark), and silicon tetrachloride was added thereto to hydrolyze the same under nitrogen atmosphere by maintaining the temperature to 10° C. while mixing by stirring. Mixing by stirring was continued for 3 hours from addition of the silicon tetrachloride to form a siliceous slurry. At this time, the stirring rate was made 150 rpm. Next, the siliceous slurry was transferred to a vessel for drying made of Teflon (registered trademark) and the vessel was charged in a dryer, and dried and dechlorinated at a temperature of 300° C. for 24 hours while flowing nitrogen with a flow amount of 15 L/min in the dryer to obtain dry powder. The dry powder was taken out from the dryer, and pulverized by using a roll crusher. At this time, the pulverization was carried out by adjusting a gap between rolls to 0.25 mm and a number of the rotation of the rolls to 90 rpm. The pulverized dry powder was classified by using a vibratory sieve having openings of 85 µm and 315 µm to obtain silica powder having a particle diameter $D_{v50}$ at a cumulative frequency of 50% in the volume-based particle size distribution of 250 µm.

Subsequently, these silica powders were charged in a fused quartz vessel, this vessel was charged in an electric furnace, and heated in an ambient atmosphere at a temperature of 900° C. for 6 hours, and then, at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.5 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 36 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, the silica powder and pure water were charged in a sieve having openings of 35 µm, and the silica powder and pure water were subjected to solid-liquid separation. Further, to the silica powder on the sieve having openings of 35 µm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 µm or less of 0.6%, a particle diameter $D_{v10}$ at a cumulative frequency of 10% in the volume-based particle size distribution of 68 μm, a particle diameter $D_{v50}$ at a cumulative frequency of 50% in the volume-based particle size distribution of 184 μm, a particle diameter $D_{v90}$ at a cumulative frequency of 90% in the volume-based particle size distribution of 296 μm, $F_{NL}/F_{NS}$ of 0.73 and a bulk density of 1.07 g/cm$^3$ was obtained.

Example 5

First, 1 mol of ultrapure water and 1 mol of ethanol were prepared based on 1 mol of tetramethoxysilane. The prepared ultrapure water and ethanol were charged in a vessel made of Teflon (registered trademark), and tetramethoxysilane was added thereto to hydrolyze the same under nitrogen atmosphere by maintaining the temperature to 60° C. while stirring. After stirring was carried out for 60 minutes from addition of the tetramethoxysilane, 25 mol of ultrapure water was further added thereto based on 1 mol of tetramethoxysilane, and mixing by stirring was continued for 6 hours to form a siliceous slurry. At this time, the stirring rate was made 100 rpm. Next, the siliceous slurry was transferred to a vessel for drying made of Teflon (registered trademark) and the vessel was charged in a dryer, and dried at a temperature of 250° C. for 24 hours while flowing nitrogen with a flow amount of 20 L/min in the dryer to obtain dry powder. The dry powder was taken out from the dryer, and pulverized by using a roll crusher. At this time, the pulverization was carried out by adjusting a gap between rolls to 0.2 mm and a number of the rotation of the rolls to 100 rpm. The pulverized dry powder was classified using an air flow classifier with a vane angle of 25° and a blower air quantity of 6 m3/min to obtain silica powder having a particle diameter $D_{v50}$ at a cumulative frequency of 50% in the volume-based particle size distribution of 177 μm was obtained.

Subsequently, these silica powders were charged in a fused quartz vessel, the vessel was charged in a vacuum furnace, and heated at a pressure of 1 Pa and at a temperature of 1,200° C. for 12 hours to carry out primary firing. The silica powder after the primary firing was taken out from the vessel made of a fused quartz, and pulverized by using a roll crusher. At this time, the pulverization was carried out by adjusting a gap between rolls to 0.5 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, the silica powder and pure water were charged in a sieve having openings of 48 μm, and the silica powder and pure water were subjected to solid-liquid separation. Further, to the silica powder on the sieve having openings of 48 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 μm or less of 1.0%, a particle diameter $D_{v-10}$ at a cumulative frequency of 10% in the volume-based particle size distribution of 74 μm, a particle diameter $D_{v50}$ at a cumulative frequency of 50% in the volume-based particle size distribution of 110 μm, a particle diameter $D_{v90}$ at a cumulative frequency of 90% in the volume-based particle size distribution of 225 μm, $F_{NL}/F_{NS}$ of 0.88 and a bulk density of 0.91 g/cm$^3$ was obtained.

Example 6

Figure 6:
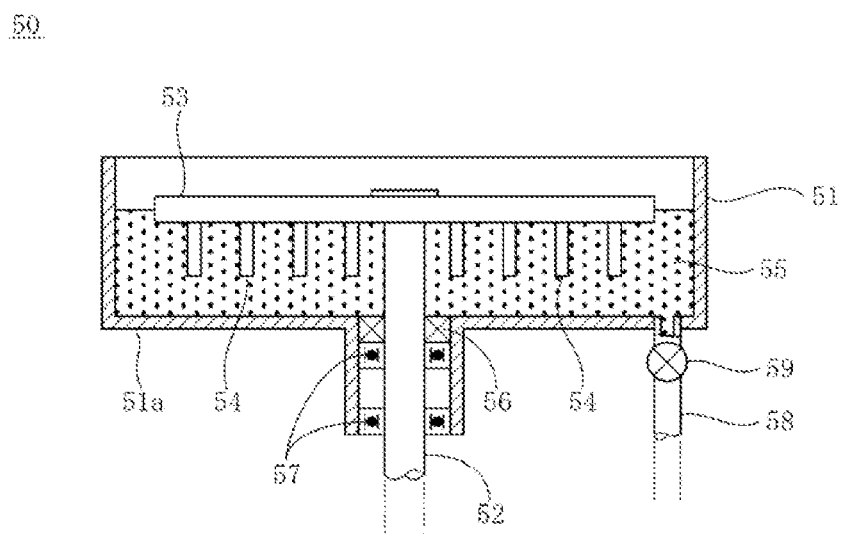
FIG. 6 is a schematic sectional view of the continuous kneading apparatus to be used for preparation of a slurry.

First, as shown in FIG. 6, fumed silica having a specific surface area of 200 m$^2$/g is fed with a rate of 3 kg/hr to a vessel 51 of a continuous kneading apparatus 50 having a plural number of rotating protruding parts 54, and deionized water at 15° C. is also fed with a rate of 7 kg/hr and mixed to form a siliceous slurry. The above continuous kneading apparatus 50 comprises a cylindrical vessel 51 having a bottom plate 51a and an upper surface of which is opened, a rotary shaft 52 which is inserted into the center of the bottom plate 51a by extending to the vertical direction and rotatably provided so that the upper end of which is positioned at the upper portion of the vessel 51, a disc-shaped rotary plate 53 firmly fixed to the upper end of the rotary shaft 52, and a plural number of columnar protruding parts 54 provided at the lower side of the rotary plate 53 each with prescribed distances to the radial direction and the circumferential direction and installed protruding downward. Between the bottom plate 51a and the rotary shaft 52, a sealing member 56 which inhibits leakage of a slurry 55 in the vessel 51, and a pair of bearings 57 and 57 which rotatably retain the rotary shaft 52 to a bottom plate 51a are interposed. Also, the reference numeral 58 in FIG. 6 is a discharge pipe to discharge the slurry 55 in the vessel 51. Further, the reference numeral 59 in FIG. 6 is a switching valve provided at the discharge pipe 58, and when the switching valve 59 is opened, the slurry 55 in the vessel 51 is discharged through the discharge pipe 58. In this Example 6, a rotation speed of the above rotary plate 53 was set to 500 rpm to prepare a siliceous slurry.

Next, the siliceous slurry was transferred to a vessel for drying made of Teflon (registered trademark) and the vessel was charged in a dryer, and the slurry was dried at a temperature of 250° C. for 24 hours while flowing argon with a flow amount of 10 L/min in the dryer to obtain dry powder. The dry powder was taken out from the dryer, and pulverized by using a roll crusher. At this time, the pulverization was carried out by adjusting a gap between rolls to 0.2 mm and a number of the rotation of the rolls to 150 rpm. The pulverized dry powder was classified by using a vibratory sieve having openings of 28 μm and 140 μm to obtain silica powder having a particle diameter $D_{v50}$ at a cumulative frequency of 50% in the volume-based particle size distribution of 103 μm.

Subsequently, these silica powders were charged in a fused quartz vessel, this vessel was charged in an electric furnace, and heated in an ambient atmosphere at a temperature of 1,190° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.3 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1280° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.2 mm and a number of the rotation of the rolls to 30 rpm.

Next, the above-mentioned silica powder after pulverization and a fluorine-based inert liquid (Product name: Fluorinert, available from Sumitomo 3M Ltd.) were charged in a beaker made of Teflon (registered trademark), and washing was carried out by stirring using stirring blade with a number of rotation of 50 rpm for 20 minutes. Thereafter, the silica powder and a fluorine-based inert liquid were charged in a sieve having openings of 35 μm, and the silica powder and the fluorine-based inert liquid were subjected to solid-liquid separation. Further, to the silica powder on the sieve having openings of 35 μm was added the fluorine-based inert liquid again to carry out washing of the silica powder.

Finally, the silica powder after washing was charged in a vessel made of Teflon (registered trademark), the vessel was charged in a dryer, and the powder was dried at a temperature of 250° C. for 24 hours while flowing nitrogen with a flow amount of 10 L/min in the dryer. According to this procedure, a synthetic amorphous silica powder having a cumulative frequency of particles having volume-based diameters of 45 μm or less of 1.8%, a particle diameter $D_{v10}$ at a cumulative frequency of 10% in the volume-based particle size distribution of 22 μm, a particle diameter $D_{v50}$ at a cumulative frequency of 50% in the volume-based particle size distribution of 76 μm, a particle diameter $D_{v90}$ at a cumulative frequency of 90% in the volume-based particle size distribution of 127 μm, $F_{NL}/F_{NS}$ of 0.30 and a bulk density of 0.75 g/cm$^3$ was obtained.

Example 7

First, 1.9 kg of ultrapure water was prepared based on 1 kg of fumed silica having a specific surface area of 50 m$^2$/g. The prepared ultrapure water was charged in a vessel made of Teflon (registered trademark), and under nitrogen atmosphere, fumed silica was added thereto while mixing by stirring by maintaining the temperature at 25° C. After adding the fumed silica, mixing by stirring was continued for 3 hours to form a siliceous slurry. The stirring rate at this time was made 30 rpm. Next, the siliceous slurry was transferred to a vessel made of Teflon (registered trademark) for drying and the vessel was charged in a dryer, and dried at a temperature of 200° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 45 rpm. The pulverized dry powder was classified by using a vibratory sieve having openings of 125 μm and 425 μm to obtain silica powder having a particle diameter $D_{v50}$ at a cumulative frequency of 50% in the volume-based particle size distribution of 323 μm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.4 mm and a number of the rotation of the rolls to 15 rpm. According to this procedure, silica powder having a particle diameter $D_{v50}$ at a cumulative frequency of 50% in the volume-based particle size distribution of 232 μm was obtained.

Figure 7:
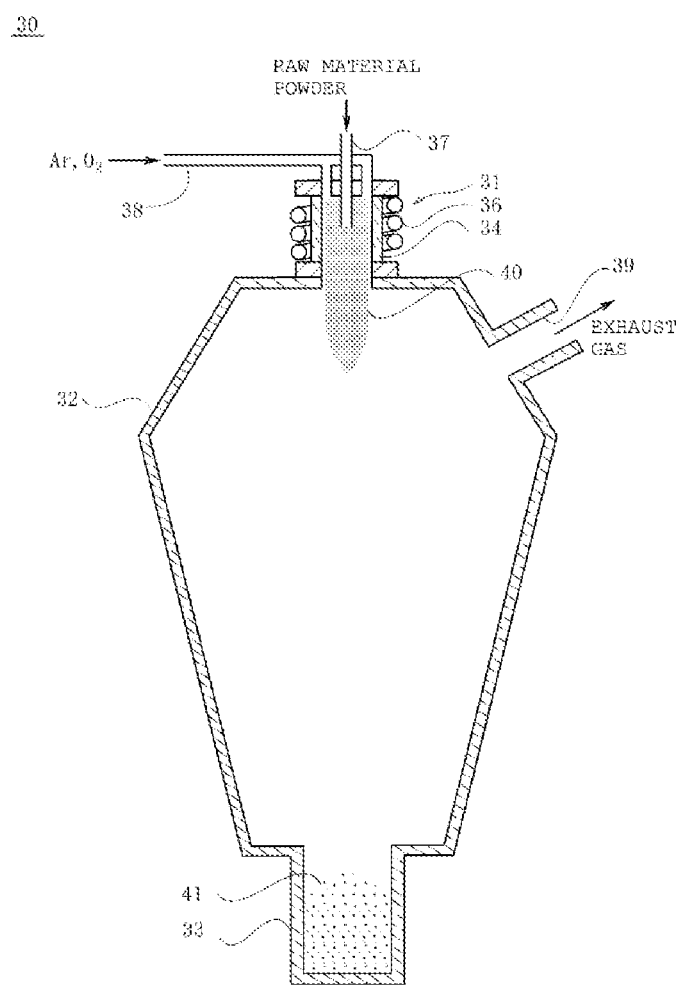
FIG. 7 is a schematic sectional view of the spheroidizing apparatus by heat plasma.

Subsequently, a spheroidizing treatment was carried out by using an apparatus 30 shown in FIG. 7. The apparatus 30 comprises a plasma torch 31 for generating a plasma, a chamber 32 which is a reaction tube provided at the lower side of the plasma torch 31, and a recovery part 33 for recovering the powder after the treatment provided at the lower side of the chamber 32. The plasma torch 31 has a quartz tube 34 communicating with the chamber 32 and the top part of which is sealed, and a high frequency induction coil 36 winding around the quartz tube 34. At the upper part of the quartz tube 34, a raw material feeding tube 37 is so provided as to penetrate therethrough, and a gas introducing tube 38 is connected thereto. A gas exhaust port 39 is provided at the side of the chamber 32. At the plasma torch 31, when the high frequency induction coil 36 is energized, a plasma 40 is generated, and a gas such as argon, oxygen and the like is fed from the gas introducing tube 38 to the quartz tube 34. The raw material powder is fed through the raw material feeding tube 37 into the plasma 40. Also, the gas in the chamber 32 is exhausted from the gas exhaust port 39 provided at the side of the chamber 32.

The conditions of the spheroidizing treatment were made a high frequency of 5 MHz, a high frequency output of 90 kW, a flow amount of an argon gas of 55 L/min and a flow amount of oxygen of 70 L/min. Specifically, first, argon as a working gas was introduced from the gas introducing tube 38 of the apparatus 30, and a high frequency was applied to the plasma torch 31 to generate a plasma. After stabilization of the plasma, oxygen was gradually introduced to generate an argon-oxygen plasma. The above-mentioned obtained silica powder was thrown from the raw material feeding tube 37 into the argon-oxygen plasma to melt the silica powder, and the particles in the state of a molten were dropped and the dropped particles were recovered at the recovery part 33.

Next, the above-mentioned recovered silica powder and a fluorine-based inert liquid (Product name: Fluorinert, available from Sumitomo 3M Ltd.) were charged in a beaker made of Teflon (registered trademark), and washing was carried out by stirring using stirring blade with a number of rotation of 50 rpm for 20 minutes. Thereafter, the silica powder and a fluorine-based inert liquid were charged in a sieve having openings of 48 μm, and the silica powder and the fluorine-based inert liquid were subjected to solid-liquid separation. Further, to the silica powder on the sieve having openings of 48 µm was added the fluorine-based inert liquid again to carry out washing of the silica powder.

Finally, the silica powder after washing was charged in a vessel made of Teflon (registered trademark), the vessel was charged in a dryer, and the powder was dried at a temperature of 250° C. for 24 hours while flowing nitrogen with a flow amount of 10 L/min in the dryer. According to this procedure, a synthetic amorphous silica powder having a cumulative frequency of particles having volume-based diameters of 45 µm or less of 0.7%, a particle diameter $D_{v10}$ at a cumulative frequency of 10% in the volume-based particle size distribution of 103 µm, a particle diameter $D_{v50}$ at a cumulative frequency of 50% in the volume-based particle size distribution of 237 µm, a particle diameter $D_{v90}$ at a cumulative frequency of 90% in the volume-based particle size distribution of 379 µm, $F_{NL}/F_{NS}$ of 1.05 and a bulk density of 1.38 g/cm³ was obtained.

Example 8

First, 2.3 kg of ultrapure water was prepared based on 1 kg of fumed silica having a specific surface area of 90 m²/g. The prepared ultrapure water was charged in a vessel made of Teflon (registered trademark), and under nitrogen atmosphere, fumed silica was added thereto while mixing by stirring by maintaining the temperature at 20° C. After adding the fumed silica, mixing by stirring was continued for 3 hours to form a siliceous slurry. At this time, the stirring rate was made 100 rpm. Next, the siliceous slurry was granulated and dried by a spray dryer with a disc type atomizer under the conditions of a disc diameter of 100 mm, a rotation number of the disc of 10,000 rpm and at a drying gas temperature of 250° C. to obtain dry powder. The dry powder was classified by using a vibratory sieve having openings of 95 µm and 375 µm to obtain silica powder having a particle diameter $D_{v50}$ at a cumulative frequency of 50% in the volume-based particle size distribution of 272 µm.

Subsequently, these silica powders were charged in a fused quartz vessel, this vessel was charged in an electric furnace, and heated in an ambient atmosphere at a temperature of 1,195° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.6 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,310° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 15 rpm.

Next, the above-mentioned silica powder after pulverization and a fluorine-based inert liquid (Product name: Fluorinert, available from Sumitomo 3M Ltd.) were charged in a beaker made of Teflon (registered trademark), and washing was carried out by stirring using stirring blade with a number of rotation of 50 rpm for 20 minutes. Thereafter, the silica powder and a fluorine-based inert liquid were charged in a sieve having openings of 38 µm, and the silica powder and the fluorine-based inert liquid were subjected to solid-liquid separation. Further, to the silica powder on the sieve having openings of 38 µm was added the fluorine-based inert liquid again to carry out washing of the silica powder.

Finally, the silica powder after washing was charged in a vessel made of Teflon (registered trademark), the vessel was charged in a dryer, and the powder was dried at a temperature of 250° C. for 24 hours while flowing nitrogen with a flow amount of 10 L/min in the dryer. According to this procedure, a synthetic amorphous silica powder having a cumulative frequency of particles having volume-based diameters of 45 µm or less of 0.7%, a particle diameter $D_{v10}$ at a cumulative frequency of 10% in the volume-based particle size distribution of 81 µm, a particle diameter $D_{v50}$ at a cumulative frequency of 50% in the volume-based particle size distribution of 213 µm, a particle diameter $D_{v90}$ at a cumulative frequency of 90% in the volume-based particle size distribution of 342 µm, $F_{NL}/F_{NS}$ of 0.85 and a bulk density of 1.35 g/cm³ was obtained.

Comparative Example 1

First, 1.9 kg of ultrapure water was prepared based on 1 kg of fumed silica having a specific surface area of 50 m²/g. The prepared ultrapure water was charged in a vessel made of Teflon (registered trademark), and under nitrogen atmosphere, fumed silica was added thereto while mixing by stirring by maintaining the temperature at 25° C. After adding the fumed silica, mixing by stirring was continued for 3 hours to form a siliceous slurry. The stirring rate at this time was made 30 rpm. Next, the siliceous slurry was transferred to a vessel made of Teflon (registered trademark) for drying and the vessel was charged in a dryer, and the powder was dried at a temperature of 200° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 70 rpm. The pulverized dry powder was classified by using a vibratory sieve having openings of 80 µm and 402 µm to obtain silica powder having a particle diameter $D_{v50}$ at a cumulative frequency of 50% in the volume-based particle size distribution of 299 µm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 30 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying an ultrasonic wave for 10 minutes. Thereafter, the silica powder and pure water were charged in a sieve having openings of 33 μm, and the silica powder and pure water were subjected to solid-liquid separation. Further, to the silica powder on the sieve having openings of 33 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing nitrogen with a flow amount of 10 L/min in the dryer. According to this procedure, a synthetic amorphous silica powder having a cumulative frequency of particles having volume-based diameters of 45 μm or less of 1.7%, a particle diameter $D_{v10}$ at a cumulative frequency of 10% in the volume-based particle size distribution of 67 μm, a particle diameter $D_{v50}$ at a cumulative frequency of 50% in the volume-based particle size distribution of 219 μm, a particle diameter $D_{v90}$ at a cumulative frequency of 90% in the volume-based particle size distribution of 364 μm, $F_{NL}/F_{NS}$ of 0.72 and a bulk density of 1.08 g/cm³ was obtained.

Comparative Example 2

First, 1.9 kg of ultrapure water was prepared based on 1 kg of fumed silica having a specific surface area of 50 m²/g. The prepared ultrapure water was charged in a vessel made of Teflon (registered trademark), and under nitrogen atmosphere, fumed silica was added thereto while mixing by stirring by maintaining the temperature at 25° C. After adding the fumed silica, mixing by stirring was continued for 3 hours to form a siliceous slurry. The stirring rate at this time was made 30 rpm. Next, the siliceous slurry was transferred to a vessel made of Teflon (registered trademark) for drying and the vessel was charged in a dryer, and the slurry was dried at a temperature of 200° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.85 mm and a number of the rotation of the rolls to 30 rpm. The pulverized dry powder was classified by using a vibratory sieve having openings of 450 μm and 850 μm to obtain silica powder having a particle diameter $D_{v50}$ at a cumulative frequency of 50% in the volume-based particle size distribution of 753 μm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 1.6 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,380° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 1.1 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying an ultrasonic wave for 10 minutes. Thereafter, the silica powder and pure water were charged in a sieve having openings of 177 μm, and the silica powder and pure water were subjected to solid-liquid separation. Further, to the silica powder on the sieve having openings of 177 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing nitrogen with a flow amount of 10 L/min in the dryer. According to this procedure, a synthetic amorphous silica powder having a cumulative frequency of particles having volume-based diameters of 45 μm or less of 0.0%, a particle diameter $D_{v10}$ at a cumulative frequency of 10% in the volume-based particle size distribution of 363 μm, a particle diameter $D_{v50}$ at a cumulative frequency of 50% in the volume-based particle size distribution of 553 μm, a particle diameter $D_{v90}$ at a cumulative frequency of 90% in the volume-based particle size distribution of 783 μm, $F_{NL}/F_{NS}$ of 3.42 and a bulk density of 1.53 g/cm³ was obtained.

Comparative Example 3

First, fumed silica having a specific surface area of 200 m²/g was fed into a vessel 51 of a continuous kneading apparatus 50 shown in FIG. 6 and used in Example 6 with the rate of 3 kg/hr, and deionized water at 15° C. was also fed with a rate of 7 kg/hr and mixed to form a siliceous slurry. In Comparative example 3, a rotation speed of the above-mentioned rotary plate 53 was set to 1,000 rpm to prepare a siliceous slurry.

Next, the siliceous slurry was transferred to a vessel for drying made of Teflon (registered trademark) and the vessel was charged in a dryer, and the slurry was dried at a temperature of 250° C. for 24 hours while flowing argon with a flow amount of 10 L/min in the dryer to obtain dry powder. The dry powder was taken out from the dryer, and pulverized by using a roll crusher. At this time, the pulverization was carried out by adjusting a gap between rolls to 0.2 mm and a number of the rotation of the rolls to 150 rpm. The pulverized dry powder was classified by using a vibratory sieve having openings of 48 μm and 132 μm to obtain silica powder having a particle diameter $D_{v50}$ at a cumulative frequency of 50% in the volume-based particle size distribution of 87 μm.

Subsequently, these silica powders were charged in a fused quartz vessel, this vessel was charged in an electric furnace, and heated in an ambient atmosphere at a temperature of 1,190° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.2 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,270° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.1 mm and a number of the rotation of the rolls to 30 rpm.

Next, the above-mentioned silica powder after pulverization and a fluorine-based inert liquid (Product name: Fluorinert, available from Sumitomo 3M Ltd.) were charged in a beaker made of Teflon (registered trademark), and washing was carried out by stirring using stirring blade with a number of rotation of 50 rpm for 20 minutes. Thereafter, the silica powder and a fluorine-based inert liquid were charged in a sieve having openings of 15 μm, and the silica powder and the fluorine-based inert liquid were subjected to solid-liquid separation. Further, to the silica powder on the sieve having openings of 15 μm was added the fluorine-based inert liquid again to carry out washing of the silica powder.

Finally, the silica powder after washing was charged in a vessel made of Teflon (registered trademark), the vessel was charged in a dryer, and the powder was dried at a temperature of 250° C. for 24 hours while flowing nitrogen with a flow amount of 10 L/min in the dryer. According to this procedure, a synthetic amorphous silica powder having a cumulative frequency of particles having volume-based diameters of 45 μm or less of 1.1%, a particle diameter $D_{v-10}$ at a cumulative frequency of 10% in the volume-based particle size distribution of 37 μm, a particle diameter $D_{v50}$ at a cumulative frequency of 50% in the volume-based particle size distribution of 64 μm, a particle diameter $D_{v90}$ at a cumulative frequency of 90% in the volume-based particle size distribution of 124 μm, $F_{NL}/F_{NS}$ of 0.44 and a bulk density of 0.84 g/cm$^3$ was obtained.

Comparative Example 4

First, 1.9 kg of ultrapure water was prepared based on 1 kg of fumed silica having a specific surface area of 50 m$^2$/g. The prepared ultrapure water was charged in a vessel made of Teflon (registered trademark), and under nitrogen atmosphere, fumed silica was added thereto while mixing by stirring by maintaining the temperature at 25° C. After adding the fumed silica, mixing by stirring was continued for 3 hours to form a siliceous slurry. The stirring rate at this time was made 30 rpm. Next, the siliceous slurry was transferred to a vessel made of Teflon (registered trademark) for drying and the vessel was charged in a dryer, and dried at a temperature of 200° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.8 mm and a number of the rotation of the rolls to 30 rpm. The pulverized dry powder was classified by using a vibratory sieve having openings of 450 μm and 850 μm to obtain silica powder having a particle diameter $D_{v50}$ at a cumulative frequency of 50% in the volume-based particle size distribution of 753 μm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 1.6 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,380° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 1.1 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying an ultrasonic wave for 10 minutes. Thereafter, the silica powder and pure water were charged in a sieve having openings of 177 μm, and the silica powder and pure water were subjected to solid-liquid separation. Further, to the silica powder on the sieve having openings of 177 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing nitrogen with a flow amount of 10 L/min in the dryer. According to this procedure, a synthetic amorphous silica powder having a cumulative frequency of particles having volume-based diameters of 45 μm or less of 0.0%, a particle diameter $D_{v10}$ at a cumulative frequency of 10% in the volume-based particle size distribution of 373 μm, a particle diameter $D_{v50}$ at a cumulative frequency of 50% in the volume-based particle size distribution of 553 μm, a particle diameter $D_{v90}$ at a cumulative frequency of 90% in the volume-based particle size distribution of 775 μm, $F_{NL}/F_{NS}$ of 3.50 and a bulk density of 1.48 g/cm$^3$ was obtained.

Comparative Example 5

First, 1.9 kg of ultrapure water was prepared based on 1 kg of fumed silica having a specific surface area of 50 m$^2$/g. The prepared ultrapure water was charged in a vessel made of Teflon (registered trademark), and under nitrogen atmosphere, fumed silica was added thereto while mixing by stirring by maintaining the temperature at 25° C. After adding the fumed silica, mixing by stirring was continued for 3 hours to form a siliceous slurry. The stirring rate at this time was made 30 rpm. Next, the siliceous slurry was transferred to a vessel made of Teflon (registered trademark) for drying and the vessel was charged in a dryer, and the slurry was dried at a temperature of 200° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 90 rpm. The pulverized dry powder was classified by using a vibratory sieve having openings of 60 μm and 400 μm to obtain silica powder having a particle diameter $D_{v50}$ at a cumulative frequency of 50% in the volume-based particle size distribution of 311 μm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 25 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying an ultrasonic wave for 10 minutes. Thereafter, the silica powder and pure water were charged in a sieve having openings of 22 μm, and the silica powder and pure water were subjected to solid-liquid separation. Further, to the silica powder on the sieve having openings of 22 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing nitrogen with a flow amount of 10 L/min in the dryer. According to this procedure, a synthetic amorphous silica powder having a cumulative frequency of particles having volume-based diameters of 45 μm or less of 0.4%, a particle diameter $D_{v10}$ at a cumulative frequency of 10% in the volume-based particle size distribution of 48 μm, a particle diameter $D_{v50}$ at a cumulative frequency of 50% in the volume-based particle size distribution of 229 μm, a particle diameter $D_{v90}$ at a cumulative frequency of 90% in the volume-based particle size distribution of 371 μm, $F_{NL}/F_{NS}$ of 0.55 and a bulk density of 1.08 g/cm$^3$ was obtained.

Comparative Example 6

First, 2.3 kg of ultrapure water was prepared based on 1 kg of fumed silica having a specific surface area of 90 m$^2$/g. The prepared ultrapure water was charged in a vessel made of Teflon (registered trademark), fumed silica was added thereto under nitrogen atmosphere by maintaining the temperature to 20° C. while stirring. Stirring was continued for 3 hours after addition of the fumed silica to form a siliceous slurry. At this time, the stirring rate was made 100 rpm. Next, the siliceous slurry was transferred to a vessel for drying made of Teflon (registered trademark) and the vessel was charged in a dryer, and dried at a temperature of 250° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 60 rpm. The pulverized dry powder was classified by using a vibratory sieve having openings of 120 μm and 400 μm to obtain silica powder having a particle diameter $D_{v50}$ at a cumulative frequency of 50% in the volume-based particle size distribution of 303 μm.

Subsequently, these silica powders were charged in a fused quartz vessel, this vessel was charged in an electric furnace, and heated in an ambient atmosphere at a temperature of 1,195° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.4 mm and a number of the rotation of the rolls to 15 rpm. According to this procedure, a synthetic amorphous silica powder having a cumulative frequency of particles having volume-based diameters of 45 μm or less of 0.7%, a particle diameter $D_{v10}$ at a cumulative frequency of 10% in the volume-based particle size distribution of 99 μm, a particle diameter $D_{v50}$ at a cumulative frequency of 50% in the volume-based particle size distribution of 223 μm, a particle diameter $D_{v90}$ at a cumulative frequency of 90% in the volume-based particle size distribution of 364 μm, $F_{NL}/F_{NS}$ of 0.28 and a bulk density of 1.13 g/cm$^3$ was obtained.

Comparative Example 7

First, 3.0 kg of ultrapure water was prepared based on 170 g of silicon tetrachloride. The ultrapure water was charged in a vessel made of Teflon (registered trademark), and silicon tetrachloride was added thereto to hydrolyze the same under nitrogen atmosphere by maintaining the temperature to 10° C. while mixing by stirring. Mixing by stirring was continued for 3 hours after addition of the silicon tetrachloride to form a siliceous slurry. At this time, the stirring rate was made 150 rpm. Next, the siliceous slurry was transferred to a vessel for drying made of Teflon (registered trademark) and the vessel was charged in a dryer, and dried and dechlorinated at a temperature of 300° C. for 24 hours while flowing nitrogen with a flow amount of 15 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 80 rpm. The pulverized dry powder was classified by using a vibratory sieve having openings of 65 μm and 425 μm to obtain silica powder having a particle diameter $D_{v50}$ at a cumulative frequency of 50% in the volume-based particle size distribution of 317 μm.

Subsequently, these silica powders were charged in a fused quartz vessel, this vessel was charged in an electric furnace, and heated in an ambient atmosphere at a temperature of 900° C. for 6 hours, and then, at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 36 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 30 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, the silica powder and pure water were charged in a sieve having openings of 25 μm, and the silica powder and pure water were subjected to solid-liquid separation. Further, to the silica powder on the sieve having openings of 25 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 μm or less of 0.3%, a particle diameter $D_{v10}$ at a cumulative frequency of 10% in the volume-based particle size distribution of 55 μm, a particle diameter $D_{v50}$ at a cumulative frequency of 50% in the volume-based particle size distribution of 233 μm, a particle diameter $D_{v90}$ at a cumulative frequency of 90% in the volume-based particle size distribution of 387 μm, $F_{NL}/F_{NS}$ of 0.61 and a bulk density of 1.09 g/cm³ was obtained.

Comparative Example 8

First, 1 mol of ultrapure water and 1 mol of ethanol were prepared based on 1 mol of tetramethoxysilane. The prepared ultrapure water and ethanol were charged in a vessel made of Teflon (registered trademark), and tetramethoxysilane was added thereto to hydrolyze the same under nitrogen atmosphere by maintaining the temperature to 60° C. while stirring. Stirring was carried out for 60 minutes after addition of the tetramethoxysilane, 25 mol of ultrapure water was further added based on 1 mol of tetramethoxysilane, and mixing by stirring was further continued for 6 hours to form a siliceous slurry. At this time, the stirring rate was made 100 rpm. Next, the siliceous slurry was transferred to a vessel for drying made of Teflon (registered trademark) and the vessel was charged in a dryer, and dried at a temperature of 250° C. for 24 hours while flowing nitrogen with a flow amount of 20 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 90 rpm. The pulverized dry powder was classified using an air flow classifier with a vane angle of 25° and a blower air quantity of 6 m³/min to obtain silica powder having a particle diameter $D_{v50}$ at a cumulative frequency of 50% in the volume-based particle size distribution of 289 μm.

Subsequently, these silica powders were charged in a fused quartz vessel, this vessel was charged in a vacuum furnace, and heated at a pressure of 1 Pa and at a temperature of 1,200° C. for 12 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 30 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, the silica powder and pure water were charged in a sieve having openings of 20 μm, and the silica powder and pure water were subjected to solid-liquid separation. Further, to the silica powder on the sieve having openings of 20 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 μm or less of 0.8%, a particle diameter $D_{v10}$ at a cumulative frequency of 10% in the volume-based particle size distribution of 39 μm, a particle diameter $D_{v50}$ at a cumulative frequency of 50% in the volume-based particle size distribution of 212 μm, a particle diameter $D_{v90}$ at a cumulative frequency of 90% in the volume-based particle size distribution of 352 μm, $F_{NL}/F_{NS}$ of 0.46 and a bulk density of 1.05 g/cm³ was obtained.

Comparative Example 9

First, 1.9 kg of ultrapure water was prepared based on 1 kg of fumed silica having a specific surface area of 50 m²/g. The prepared ultrapure water was charged in a vessel made of Teflon (registered trademark), and under nitrogen atmosphere, fumed silica was added thereto while mixing by stirring and maintaining the temperature at 25° C. After adding the fumed silica, mixing by stirring was continued for 3 hours to form a siliceous slurry. The stirring rate at this time was made 30 rpm. Next, the siliceous slurry was transferred to a vessel made of Teflon (registered trademark) for drying and the vessel was charged in a dryer, and the slurry was dried at a temperature of 200° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 70 rpm. The pulverized dry powder was classified by using a vibratory sieve having openings of 53 μm and 400 μm to obtain silica powder having a particle diameter $D_{v50}$ at a cumulative frequency of 50% in the volume-based particle size distribution of 293 μm.

Subsequently, these silica powders were charged in a fused quartz vessel, this vessel was charged in an electric furnace, and heated in an ambient atmosphere at a temperature of 1,200° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 30 rpm. According to this procedure, silica powder having a particle diameter $D_{v50}$ at a cumulative frequency of 50% in the volume-based particle size distribution of 232 μm was obtained.

Subsequently, a spheroidizing treatment was carried out by using an apparatus 30 shown in FIG. 7 used in Example 7. The above-mentioned obtained silica powder was subjected to the spheroidizing treatment under the conditions of the spheroidizing treatment of a high frequency of 5 MHz, a high frequency output of 90 kW, a flow amount of an argon gas of 55 L/min, a flow amount of oxygen of 70 L/min. Specifically, first, argon as a working gas was introduced from the gas introducing tube 38 of the apparatus 30, and a high frequency was applied to the plasma torch 31 to generate a plasma. After stabilization of the plasma, oxygen was gradually introduced to generate an argon-oxygen plasma. The above-mentioned obtained silica powder was thrown from the raw material feeding tube 37 into the argon-oxygen plasma to melt the silica powder, and the particles in the state of a molten were dropped and the dropped particles were recovered at the recovery part 33.

Next, the above-mentioned recovered silica powder and a fluorine-based inert liquid (Product name: Fluorinert, available from Sumitomo 3M Ltd.) were charged in a beaker made of Teflon (registered trademark), and washing was carried out by stirring using stirring blade with a number of rotation of 50 rpm for 20 minutes. Thereafter, the silica powder and a fluorine-based inert liquid were charged in a sieve having openings of 20 μm, and the silica powder and the fluorine-based inert liquid were subjected to solid-liquid separation. Further, to the silica powder on the sieve having openings of 20 μm was added the fluorine-based inert liquid again to carry out washing of the silica powder.

Finally, the silica powder after washing was charged in a vessel made of Teflon (registered trademark), the vessel was charged in a dryer, and the powder was dried at a temperature of 250° C. for 24 hours while flowing nitrogen with a flow amount of 10 L/min in the dryer. According to this procedure, a synthetic amorphous silica powder having a cumulative frequency of particles having volume-based diameters of 45 μm or less of 0.8%, a particle diameter $D_{v10}$ at a cumulative frequency of 10% in the volume-based particle size distribution of 43 μm, a particle diameter $D_{v50}$ at a cumulative frequency of 50% in the volume-based particle size distribution of 215 μm, a particle diameter $D_{v90}$ at a cumulative frequency of 90% in the volume-based particle size distribution of 356 μm, $F_{NL}/F_{NS}$ of 0.50 and a bulk density of 1.37 g/cm³ was obtained.

Comparative Example 10

First, 2.3 kg of ultrapure water was prepared based on 1 kg of fumed silica having a specific surface area of 90 m²/g.

The prepared ultrapure water was charged in a vessel made of Teflon (registered trademark), and under nitrogen atmosphere, fumed silica was added thereto while mixing by stirring and maintaining the temperature at 20° C. After adding the fumed silica, mixing by stirring was continued for 3 hours to form a siliceous slurry. At this time, the stirring rate was made 100 rpm. Next, the siliceous slurry was granulated and dried by a spray dryer with a disc type atomizer under the conditions of a disc diameter of 100 mm, a rotation number of the disc of 10,000 rpm and at a drying gas temperature of 250° C. to obtain dry powder. The dry powder was classified by using a vibratory sieve having openings of 53 μm and 400 μm to obtain silica powder having a particle diameter $D_{v50}$ at a cumulative frequency of 50% in the volume-based particle size distribution of 307 μm.

Subsequently, these silica powders were charged in a fused quartz vessel, this vessel was charged in an electric furnace, and heated in an ambient atmosphere at a temperature of 1,195° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,300° C. for 48 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 30 rpm.

Next, the above-mentioned recovered silica powder and a fluorine-based inert liquid (Product name: Fluorinert, available from Sumitomo 3M Ltd.) were charged in a beaker made of Teflon (registered trademark), and washing was carried out by stirring using stirring blade with a number of rotation of 50 rpm for 20 minutes. Thereafter, the silica powder and a fluorine-based inert liquid were charged in a sieve having openings of 22 μm, and the silica powder and the fluorine-based inert liquid were subjected to solid-liquid separation. Further, to the silica powder on the sieve having openings of 22 μm was added the fluorine-based inert liquid again to carry out washing of the silica powder.

Finally, the silica powder after washing was charged in a vessel made of Teflon (registered trademark), the vessel was charged in a dryer, and the powder was dried at a temperature of 250° C. for 24 hours while flowing nitrogen with a flow amount of 10 L/min in the dryer. According to this procedure, a synthetic amorphous silica powder having a cumulative frequency of particles having volume-based diameters of 45 μm or less of 0.7%, a particle diameter $D_{v10}$ at a cumulative frequency of 10% in the volume-based particle size distribution of 47 μm, a particle diameter $D_{v50}$ at a cumulative frequency of 50% in the volume-based particle size distribution of 226 μm, a particle diameter $D_{v90}$ at a cumulative frequency of 90% in the volume-based particle size distribution of 369 μm, $F_{NL}/F_{NS}$ of 0.54 and a bulk density of 1.34/cm³ was obtained.

Comparative Example 11

First, 2.3 kg of ultrapure water was prepared based on 1 kg of fumed silica having a specific surface area of 90 m²/g.

The prepared ultrapure water was charged in a vessel made of Teflon (registered trademark), and under nitrogen atmosphere, fumed silica was added thereto while mixing by stirring and maintaining the temperature at 20° C. After adding the fumed silica, mixing by stirring was continued for 3 hours to form a siliceous slurry. At this time, the stirring rate was made 100 rpm. Next, the siliceous slurry was transferred to a vessel for drying made of Teflon (registered trademark) and the vessel was charged in a dryer, and the slurry was dried at a temperature of 250° C. for 24 hours while flowing nitrogen with a flow amount of 10 L/min in the dryer to obtain dry powder. The dry powder was taken out from the dryer, and pulverized by using a roll crusher. At this time, the pulverization was carried out by adjusting a gap between rolls to 0.3 mm and a number of the rotation of the rolls to 60 rpm. The pulverized dry powder was classified by using a vibratory sieve having openings of 120 μm and 400 μm to obtain silica powder having a particle diameter $D_{v50}$ at a cumulative frequency of 50% in the volume-based particle size distribution of 303 μm.

Subsequently, these silica powders were charged in a fused quartz vessel, this vessel was charged in an electric furnace, and heated in an ambient atmosphere at a temperature of 1,160° C. for 3 hours to carry out primary firing. The silica powder after the primary firing was taken out from the vessel made of a fused quartz, and pulverized by using a roll crusher. At this time, the pulverization was carried out by adjusting a gap between rolls to 0.7 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,050° C. for 36 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.4 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, silica powder and pure water were charged in a sieve having openings of 48 μm, and the silica powder and pure water were subjected to solid-liquid separation. Further, to the silica powder on the sieve having openings of 48 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 μm or less of 0.7%, a particle diameter $D_{v10}$ at a cumulative frequency of 10% in the volume-based particle size distribution of 113 μm, a particle diameter $D_{v50}$ at a cumulative frequency of 50% in the volume-based particle size distribution of 263 μm, a particle diameter $D_{v90}$ at a cumulative frequency of 90% in the volume-based particle size distribution of 428 μm, $F_{NL}/F_{NS}$ of 1.16 and a bulk density of 0.63 g/cm³ was obtained.

Comparative Example 12

First, 3.0 kg of ultrapure water was prepared based on 170 g of silicon tetrachloride. The ultrapure water was charged in a vessel made of Teflon (registered trademark), and silicon tetrachloride was added thereto to hydrolyze the same under nitrogen atmosphere by maintaining the temperature to 10° C. while mixing by stirring. After mixing by stirring was continued for 3 hours from addition of silicon tetrachloride, a siliceous slurry was formed. At this time, the stirring rate was made 150 rpm. Next, the siliceous slurry was transferred to a vessel for drying made of Teflon (registered trademark) and the vessel was charged in a dryer, and the slurry was dried and dechlorinated at a temperature of 300° C. for 24 hours while flowing nitrogen with a flow amount of 15 L/min in the dryer to obtain dry powder. The dry powder was taken out from the dryer, and pulverized by using a roll crusher. At this time, the pulverization was carried out by adjusting a gap between rolls to 0.25 mm and a number of the rotation of the rolls to 90 rpm. The pulverized dry powder was classified by using a vibratory sieve having openings of 85 μm and 315 μm to obtain silica powder having a particle diameter $D_{v50}$ at a cumulative frequency of 50% in the volume-based particle size distribution of 250 μm.

Subsequently, these silica powders were charged in a fused quartz vessel, this vessel was charged in an electric furnace, and heated in an ambient atmosphere at a temperature of 500° C. for 6 hours, and then, at a temperature of 800° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.5 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,000° C. for 36 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, silica powder and pure water were charged in a sieve having openings of 35 μm, and the silica powder and pure water were subjected to solid-liquid separation. Further, to the silica powder on the sieve having openings of 35 μm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 μm or less of 0.7%, a particle diameter $D_{v10}$ at a cumulative frequency of 10% in the volume-based particle size distribution of 82 μm, a particle diameter $D_{v50}$ at a cumulative frequency of 50% in the volume-based particle size distribution of 221 µm, a particle diameter $D_{v90}$ at a cumulative frequency of 90% in the volume-based particle size distribution of 355 µm, $F_{NL}/F_{NS}$ of 0.88 and a bulk density of 0.66 g/cm³ was obtained.

Comparative Example 13

First, 1 mol of ultrapure water and 1 mol of ethanol were prepared based on 1 mol of tetramethoxysilane. The prepared ultrapure water and ethanol were charged in a vessel made of Teflon (registered trademark), and tetramethoxysilane was added thereto to hydrolyze the same under nitrogen atmosphere by maintaining the temperature to 60° C. while stirring. After stirring for 60 minutes from addition of the tetramethoxysilane, 25 mol of ultrapure water was further added based on 1 mol of tetramethoxysilane, and mixing by stirring was continued for 6 hours to form a siliceous slurry. At this time, the stirring rate was made 100 rpm. Next, the siliceous slurry was transferred to a vessel for drying made of Teflon (registered trademark) and the vessel was charged in a dryer, and the slurry was dried at a temperature of 250° C. for 24 hours while flowing nitrogen with a flow amount of 20 L/min in the dryer to obtain dry powder. The dry powder was taken out from the dryer, and pulverized by using a roll crusher. At this time, the pulverization was carried out by adjusting a gap between rolls to 0.2 mm and a number of the rotation of the rolls to 100 rpm. The pulverized dry powder was classified using an air flow classifier with a vane angle of 25° and a blower air quantity of 6 m³/min to obtain silica powder having a particle diameter $D_{v50}$ at a cumulative frequency of 50% in the volume-based particle size distribution of 177 µm.

Subsequently, these silica powders were charged in a fused quartz vessel, this vessel was charged in a vacuum furnace, and heated at a pressure of 1 Pa and at a temperature of 850° C. for 24 hours to carry out primary firing. The silica powder after the primary firing was taken out from the vessel made of a fused quartz, and pulverized by using a roll crusher. At this time, the pulverization was carried out by adjusting a gap between rolls to 0.5 mm and a number of the rotation of the rolls to 10 rpm. Further, the silica powder was again charged in the vessel made of a fused quartz, and the vessel was charged in an atmosphere furnace. The powder was subjected to the secondary firing by heating at a temperature of 1,050° C. for 12 hours while flowing high purity oxygen having a purity of 99.9995% with a flow amount of 5 L/min in the atmosphere furnace. The silica powder after the secondary firing was taken out from the vessel made of a fused quartz, and pulverized by using a roll crusher. At this time, the pulverization was carried out by adjusting a gap between rolls to 0.3 mm and a number of the rotation of the rolls to 15 rpm.

Next, the above-mentioned silica powder after pulverization and pure water were charged in a beaker made of Teflon (registered trademark), the beaker made of Teflon (registered trademark) was charged in an ultrasonic wave washing tank, and ultrasonic wave washing was carried out while applying ultrasonic wave for 15 minutes. Thereafter, silica powder and pure water were charged in a sieve having openings of 48 µm, and the silica powder and pure water were subjected to solid-liquid separation. Further, to the silica powder on the sieve having openings of 48 µm was added pure water to carry out washing of the silica powder.

Finally, the silica powder after washing was charged in a vessel made of Teflon (registered trademark), the vessel was charged in a dryer, and the powder was dried at a temperature of 200° C. for 24 hours while flowing dry air with a flow amount of 10 L/min in the dryer. According to this procedure, a synthetic amorphous silica powder having a cumulative frequency of particles having volume-based diameters of 45 µm or less of 0.8%, a particle diameter $D_{v10}$ at a cumulative frequency of 10% in the volume-based particle size distribution of 119 µm, a particle diameter $D_{v50}$ at a cumulative frequency of 50% in the volume-based particle size distribution of 285 µm, a particle diameter $D_{v90}$ at a cumulative frequency of 90% in the volume-based particle size distribution of 455 µm, $F_{NL}/F_{NS}$ of 1.21 and a bulk density of 0.67 g/cm³ was obtained.

<Evaluation and Comparative Test>

Figure 2:
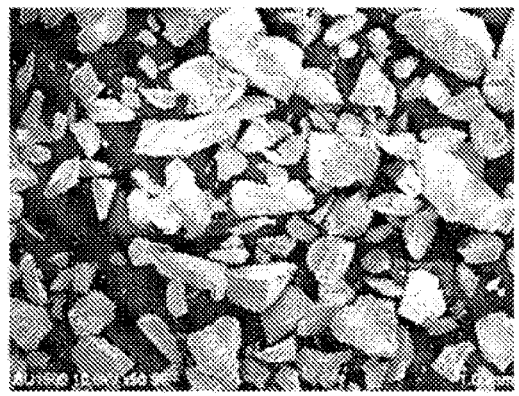
FIG. 2 is a photographic drawing of the synthetic amorphous silica powder before washing with an ultrasonic wave of Example 3 by a scanning type microscope (SEM).
Figure 3:
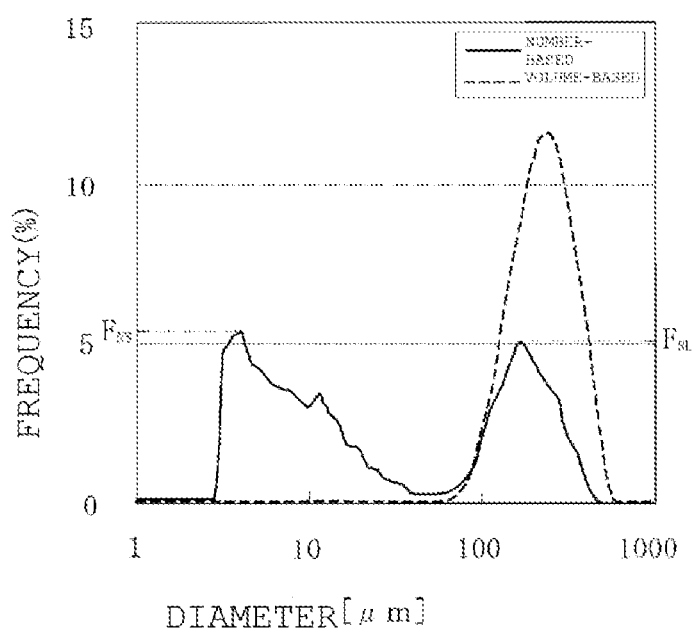
FIG. 3 is a drawing showing volume-based and number-based particle size distributions of the synthetic amorphous silica powder obtained in Example 3.
Figure 4:
FIG. 4 is a photographic drawing of the synthetic amorphous silica powder obtained in Example 3 by a scanning type microscope (SEM).

Concentrations of the impurities of the powders obtained in Examples 1 to 8 and Comparative examples 1 to 13 were analyzed or measured by the following methods. Also, quartz crucibles were prepared by using the powders of Examples 1 to 8 and Comparative examples 1 to 13, respectively, and a content of bubbles per unit volume was evaluated. These results are shown in the following Table 1. Further, a particle size distribution and a photographic drawing of the synthetic amorphous silica powder before washing with an ultrasonic wave of Example 3 observed by a scanning type microscope (SEM) are shown in FIG. 1 and FIG. 2, respectively. Moreover, a particle size distribution and a photographic drawing of the synthetic amorphous silica powder obtained in Example 3 observed by a scanning type microscope (SEM) are shown in FIG. 3 and FIG. 4, respectively.

(i) C: Iron, tungsten and tin were added to the powder as a combustion improver, and analysis was carried out by an infrared absorption method after combustion in a high-frequency induction furnace (Type name: EMIA-920V manufactured by HORIBA, Ltd.) in an oxygen atmosphere.

(ii) Cl: Ultrapure water was mixed with synthetic amorphous silica powder, and Cl was leached under an ultrasonic wave. The synthetic amorphous silica powder and the leached liquid were separated by a centrifugal separator, and the leached liquid was analyzed by ion chromatography (Type name: DX-500 manufactured by NIPPON DIONEX K.K).

(iii) OH: By a Fourier transform type infrared spectrometer (Type name: Nicolet 4700FT-IR manufactured by Thermo Fisher Scientific Inc.), it was measured by a height of the peak at around 3660 cm⁻¹.

(iv) Content of air bubbles: Along an inner surface of a mold for manufacturing a quartz crucible having a diameter of 16 inches, a natural quartz powder with about 8 mm, and the powders obtained in Examples 1 to 8 and Comparative examples 1 to 13 with about 2.5 mm were filled respectively. An arc electrode was provided so that it was on the center axis of the mold, and a tip portion of the electrode was located at the position of 400 mm upward from the bottom face of the mold (the same level as the upper end surface of the mold). While rotating the mold with a prescribed rate, the arc electrode was energized with a powder of 200 kw for 5 minutes to melt the quartz powder. Then, the arc electrode was descended 200 mm, and energized with the same power for 8 minutes to heat the quartz at the neighbor of the center at the bottom of the mold concentratedly and a pressure was reduced from the side of the mold for 6 minutes during the energization.

The obtained quartz crucible was cut in a strip shape with a width of 3 cm, and subjected to a heat treatment under vacuum atmosphere of 5.0×10² Pa at a temperature of 1,600° C. for 48 hours. After the heat treatment, the portion of 10 cm to 15 cm from the upper end of the quartz crucible was cut, the cross-section of which was polished, and contents of the air bubbles generating at the melted portions of the powders of Examples 1 to 8 and Comparative examples 1 to 13 per unit volume were evaluated.

TABLE 1

| | 45 μm or less [%] | $D_{v10}$ [μm] | $D_{v50}$ [μm] | $D_{v90}$ [μm] | $(D_{v90}-D_{v10})/D_{v50}$ | $F_{NL}/F_{NS}$ | Bulk density [g/cm³] | Impurity concentration [wt ppm] | | | Content of air bubbles [vol %] |
|---|---|---|---|---|---|---|---|---|---|---|---|
| | | | | | | | | C | OH | Cl | |
| Example 1 | 0.0 | 344 | 509 | 749 | 0.79 | 3.24 | 1.50 | <2 | 67 | <2 | 0.02 |
| Example 2 | 0.4 | 187 | 375 | 560 | 0.99 | 1.81 | 1.31 | <2 | 60 | <2 | 0.07 |
| Example 3 | 0.7 | 99 | 223 | 364 | 1.19 | 0.96 | 1.13 | <2 | 50 | <2 | 0.10 |
| Example 4 | 0.6 | 68 | 184 | 296 | 1.24 | 0.73 | 1.07 | <2 | 39 | 4 | 0.11 |
| Example 5 | 1.0 | 74 | 110 | 225 | 1.37 | 0.88 | 0.91 | 4.5 | 56 | <2 | 0.10 |
| Example 6 | 1.8 | 22 | 76 | 127 | 1.39 | 0.30 | 0.75 | <2 | 44 | <2 | 0.18 |
| Example 7 | 0.7 | 103 | 237 | 379 | 1.16 | 1.05 | 1.38 | <2 | 34 | <2 | 0.12 |
| Example 8 | 0.7 | 81 | 213 | 342 | 1.23 | 0.85 | 1.35 | <2 | 56 | <2 | 0.12 |
| Comparative example 1 | 1.7 | 67 | 219 | 364 | 1.35 | 0.72 | 1.08 | <2 | 55 | <2 | 0.42 |
| Comparative example 2 | 0.0 | 363 | 553 | 783 | 0.76 | 3.42 | 1.53 | <2 | 70 | <2 | 0.31 |
| Comparative example 3 | 1.1 | 37 | 64 | 124 | 1.36 | 0.44 | 0.84 | <2 | 36 | <2 | 0.53 |
| Comparative example 4 | 0.0 | 373 | 553 | 775 | 0.73 | 3.50 | 1.48 | <2 | 77 | <2 | 0.35 |
| Comparative example 5 | 0.4 | 48 | 229 | 371 | 1.41 | 0.55 | 1.08 | <2 | 54 | <2 | 0.38 |
| Comparative example 6 | 0.7 | 99 | 223 | 364 | 1.19 | 0.28 | 1.13 | <2 | 53 | <2 | 0.21 |
| Comparative example 7 | 0.3 | 55 | 233 | 387 | 1.43 | 0.61 | 1.09 | <2 | 49 | 4 | 0.34 |
| Comparative example 8 | 0.8 | 39 | 212 | 352 | 1.48 | 0.46 | 1.05 | 4 | 48 | <2 | 0.33 |
| Comparative example 9 | 0.8 | 43 | 215 | 356 | 1.45 | 0.50 | 1.37 | <2 | 50 | <2 | 0.32 |
| Comparative example 10 | 0.7 | 47 | 226 | 369 | 1.42 | 0.54 | 1.34 | <2 | 53 | <2 | 0.25 |
| Comparative example 11 | 0.7 | 113 | 263 | 428 | 1.20 | 1.16 | 0.63 | <2 | 97 | <2 | 0.48 |

TABLE 1-continued

|  | 45 μm or less [%] | $D_{v10}$ [μm] | $D_{v50}$ [μm] | $D_{v90}$ [μm] | $(D_{v90}-D_{v10})/D_{v50}$ | $F_{NL}/F_{NS}$ | Bulk density [g/cm³] | Impurity concentration [wt ppm] | | | Content of air bubbles [vol %] |
|---|---|---|---|---|---|---|---|---|---|---|---|
|  |  |  |  |  |  |  |  | C | OH | Cl |  |
| Comparative example 12 | 0.7 | 82 | 221 | 355 | 1.24 | 0.88 | 0.66 | <2 | 41 | 7 | 0.45 |
| Comparative example 13 | 0.8 | 119 | 285 | 455 | 1.18 | 1.21 | 0.67 | 12 | 57 | <2 | 0.42 |

As clearly seen from Table 1, when Examples 1 to 8 and Comparative examples 1 to 13 are compared to each other, in the synthetic amorphous silica powders of Examples 1 to 8 in which a particle diameter $D_{v50}$ at a cumulative frequency of 50% in the volume-based particle size distribution, the cumulative frequency of particles having volume-based diameters of 45 μm or less, the value of $(D_{v90}-D_{v10})/D_{50}$, the value of $F_{NL}/F_{NS}$ and the bulk density have been controlled to the desired values, contents of the air bubbles in the quartz crucibles are markedly reduced as compared with those of Comparative examples 1 to 13 in which any of these values is/are not satisfied the prescribed conditions. In particular, when Example 3 and Comparative example 6 which are subjected to the same conditions by the pulverization after the secondary firing are compared to each other, in Example 3 in which washing with an ultrasonic wave, etc., has been carried out after the pulverization and $F_{NL}/F_{NS}$ has been controlled to a desired value, it can be understood that the content of the air bubbles is further reduced as compared to that of Comparative example 6. Also, it can be understood that relatively good results can be also obtained in Example 1, etc., in which no spheroidizing treatment has been done as compared with those of Example 7 in which the spheroidizing treatment has been done. Further, in Examples 1 to 3 and 6 to 8 using the fumed silica having a specific surface area of 50 to 200 m²/g as the raw material, it can be understood that all of the concentration of carbon, the concentration of chlorine and the concentration of the hydroxyl group are reduced lower than the prescribed value.

From the above results, the synthetic amorphous silica powder of the present invention has extremely high reducing effect in occurrence or expansion of the air bubbles, and it can be confirmed that it is suitable as a raw material for a synthetic silica glass product.

UTILIZABILITY IN INDUSTRY

The synthetic amorphous silica powder of the present invention can be used as a raw material for manufacturing a synthetic silica glass product such as a crucible and a jig to be used for manufacturing a single crystal used for a semiconductor.

The invention claimed is:
1. A synthetic amorphous silica powder obtained by subjecting silica as a raw material to granulation and firing, wherein a particle diameter $D_{v50}$ at a cumulative frequency of 50% in a volume-based particle size distribution is 72 μm or more and 509 μm or less,
a cumulative frequency of particles having volume-based diameters of 45 μm or less is 1.8% or less,
a value obtained by dividing a difference between a particle diameter $D_{v90}$ at a cumulative frequency of 90% in a volume-based particle size distribution and a particle diameter $D_{v10}$ at a cumulative frequency of 10% in a volume-based particle size distribution by a particle diameter $D_{v50}$ at a cumulative frequency of 50% in a volume-based particle size distribution is 0.79 or more and 1.40 or less,
$F_{NL}/F_{NS}$ which is a ratio of a frequency $F_{NL}$ of a frequency peak in a number particle size distribution existing at a neighbor of the particle diameter $D_{v50}$ at a cumulative frequency of 50% in a volume-based particle size distribution, and a frequency $F_{NS}$ of a frequency peak in a number-based particle size distribution existing at a particle diameter of 30 μm or less is 0.3 or more, and a bulk density is 0.75 g/cm³ or more and 1.5 g/cm³ or less.
2. The synthetic amorphous silica powder according to claim 1, wherein fumed silica having a specific surface area of 50 to 200 m²/g is used as a raw material, a concentration of carbon is less than 2 ppm, a concentration of a hydroxyl group is less than 70 ppm, and a concentration of chlorine is less than 2 ppm.
3. A process for manufacturing a synthetic amorphous silica powder which comprises:
a granulation step of forming a siliceous slurry and obtaining silica powder having a particle diameter $D_{v50}$ at a cumulative frequency of 50% in the volume-based particle size distribution of 100 to 700 μm from the siliceous slurry,
a step of subjecting the silica powder obtained in the granulation step to a primary firing at a temperature of 900 to 1200° C.,
a step of subjecting the silica powder after the primary firing to pulverization and a secondary firing at a temperature of 1100 to 1400° C.,
a step of subjecting the silica powder after the secondary firing to pulverization and washing with a ultrasonic wave or washing by using a fluorine-based inert liquid, and
a step of subjecting the silica powder after washing to solid-liquid separation using a sieve having openings of 35 to 95 μm and drying
to obtain a synthetic amorphous silica powder having a particle diameter $D_{v50}$ at a cumulative frequency of 50% in the volume-based particle size distribution of 72 μm or more and 509 μm or less, a cumulative frequency of particles having volume-based diameters of 45 μm or less of 1.8% or less, a value obtained by dividing a difference between a particle diameter $D_{v90}$ at a cumulative frequency of 90% in a volume-based particle size distribution and a particle diameter $D_{v10}$ at a cumulative frequency of 10% in a volume-based particle size distribution by a particle diameter $D_{v50}$ at a cumulative frequency of 50% in a volume-based particle size distribution of 0.79 or more and 1.40 or less, $F_{NL}/F_{NS}$ which is a ratio of a frequency $F_{NL}$ of a frequency peak in a number-based particle size distribution existing at a neighbor of the particle diameter $D_{v50}$ at a cumulative frequency of 50% in a volume-based particle size distribution, and a frequency $F_{NS}$ of a frequency peak in a number-based particle size distribution existing at a particle diameter of 30 μm or less of 0.3 or more and a bulk density of 0.75 g/cm$^3$ or more and 1.5 g/cm$^3$ or less.

4. The process for manufacturing a synthetic amorphous silica powder according to claim 3, wherein the granulation step is a step which comprises hydrolyzing silicon tetrachloride to form a siliceous slurry, drying the siliceous slurry to make a dry powder, and classifying the dry powder after pulverization or without pulverization.

5. The process for manufacturing a synthetic amorphous silica powder according to claim 3, wherein the granulation step is a step which comprises hydrolyzing an organic silicon compound to form a siliceous slurry, drying the siliceous slurry to make a dry powder, and classifying the dry powder after pulverization or without pulverization.

6. The process for manufacturing a synthetic amorphous silica powder according to claim 3, wherein the granulation step is a step which comprises forming a siliceous slurry by using fumed silica, drying the siliceous slurry to make a dry powder, and classifying the dry powder after pulverization or without pulverization.

\* \* \* \* \*